US010268909B2

(12) United States Patent
Sathyanarayana et al.

(10) Patent No.: US 10,268,909 B2
(45) Date of Patent: Apr. 23, 2019

(54) SYSTEMS AND METHODS FOR NEAR-CRASH DETERMINATION

(71) Applicant: Nauto, Inc., Palo Alto, CA (US)

(72) Inventors: Suchitra Sathyanarayana, Palo Alto, CA (US); Ravi Kumar Satzoda, Palo Alto, CA (US); Stefan Heck, Palo Alto, CA (US)

(73) Assignee: Nauto, Inc., Palo Alto, CA (US)

( * ) Notice: Subject to any disclaimer, the term of this patent is extended or adjusted under 35 U.S.C. 154(b) by 0 days.

(21) Appl. No.: 15/892,899

(22) Filed: Feb. 9, 2018

(65) Prior Publication Data

US 2018/0165531 A1 Jun. 14, 2018

Related U.S. Application Data

(63) Continuation of application No. 15/705,043, filed on Sep. 14, 2017, now Pat. No. 9,928,432.

(60) Provisional application No. 62/412,419, filed on Oct. 25, 2016, provisional application No. 62/394,298, filed on Sep. 14, 2016.

(51) Int. Cl.
| | |
|---|---|
| G06K 9/00 | (2006.01) |
| G05D 1/00 | (2006.01) |
| G06K 9/62 | (2006.01) |
| G06N 7/00 | (2006.01) |
| G07C 5/08 | (2006.01) |
| H04N 5/247 | (2006.01) |
| G06N 20/00 | (2019.01) |

(52) U.S. Cl.
CPC ....... *G06K 9/00805* (2013.01); *G05D 1/0055* (2013.01); *G05D 1/0088* (2013.01); *G06K 9/6218* (2013.01); *G06N 7/005* (2013.01); *G07C 5/0866* (2013.01); *H04N 5/247* (2013.01); *G05D 2201/0213* (2013.01); *G06N 20/00* (2019.01)

(58) Field of Classification Search
CPC ....... G06Q 40/08; G07C 5/00; G06K 9/00805
See application file for complete search history.

(56) References Cited

U.S. PATENT DOCUMENTS

| | | | |
|---|---|---|---|
| 5,584,035 | A | 12/1996 | Duggan et al. |
| 5,638,116 | A | 6/1997 | Shimoura et al. |
| 5,798,949 | A | 8/1998 | Kaub |
| 5,898,390 | A | 4/1999 | Oshizawa et al. |
| 6,018,728 | A | 1/2000 | Spence et al. |
| 6,240,367 | B1 | 5/2001 | Lin |
| 6,480,784 | B2 | 11/2002 | Mizuno |
| 6,502,033 | B1 | 12/2002 | Phuyal |

(Continued)

FOREIGN PATENT DOCUMENTS

| | | |
|---|---|---|
| WO | 2014154771 A1 | 10/2014 |
| WO | 135561 | 9/2016 |

OTHER PUBLICATIONS

Guo Feng: et al. Task 3-Evaluating the Relationship Between Near-Crashes and Crashes: Can Near-Crashes Serve as a Surrogate Safety Metric for Crashes? Virginia Tech Transportation Institute, U.S. Department of Transportation, Sep. 2010.

*Primary Examiner* — Adam D Tissot
*Assistant Examiner* — Alex C Dunn
(74) *Attorney, Agent, or Firm* — Jeffrey Schox; Diana Lin

(57) ABSTRACT

A method for near-collision detection, including determining a risk map for a vehicle and automatically detecting a near-collision event with an object based on vehicle behavior relative to the risk map.

16 Claims, 11 Drawing Sheets

(56) References Cited

U.S. PATENT DOCUMENTS

| | | |
|---|---|---|
| 6,662,141 B2 | 12/2003 | Kaub |
| 6,720,920 B2 | 4/2004 | Breed et al. |
| 7,085,637 B2 | 8/2006 | Breed et al. |
| 7,148,913 B2 | 12/2006 | Keaton et al. |
| 7,212,651 B2 | 5/2007 | Viola et al. |
| 7,421,321 B2 | 9/2008 | Breed et al. |
| 7,471,929 B2 | 12/2008 | Fujioka et al. |
| 7,502,677 B2 | 3/2009 | Weichenberger et al. |
| 7,502,688 B2 | 3/2009 | Hirokawa |
| 7,558,672 B2 | 7/2009 | Egami et al. |
| 7,646,922 B2 | 1/2010 | Au et al. |
| 7,844,077 B2 | 11/2010 | Kochi et al. |
| 7,853,072 B2 | 12/2010 | Han et al. |
| 7,868,821 B2 | 1/2011 | Hoshizaki |
| 7,912,288 B2 | 3/2011 | Winn et al. |
| 8,174,568 B2 | 5/2012 | Samarasekera et al. |
| 8,195,394 B1 | 6/2012 | Zhu et al. |
| 8,254,670 B2 | 8/2012 | Prokhorov |
| 8,266,132 B2 | 9/2012 | Ofek et al. |
| 8,301,344 B2 | 10/2012 | Simon et al. |
| 8,344,849 B2 | 1/2013 | Larsson et al. |
| 8,447,519 B2 | 5/2013 | Basnayake et al. |
| 8,498,813 B2 | 7/2013 | Oohashi et al. |
| 8,594,920 B2 | 11/2013 | Shida |
| 8,606,492 B1 | 12/2013 | Botnen |
| 8,619,135 B2 * | 12/2013 | Shellshear ............... H04N 7/18 348/135 |
| 8,654,151 B2 * | 2/2014 | Kim ..................... G06T 19/006 345/629 |
| 8,676,498 B2 | 3/2014 | Ma et al. |
| 8,744,642 B2 | 6/2014 | Nemat-Nasser et al. |
| 8,805,707 B2 | 8/2014 | Schumann, Jr. et al. |
| 8,854,199 B2 | 10/2014 | Cook et al. |
| 8,862,380 B2 | 10/2014 | Jung |
| 8,934,709 B2 | 1/2015 | Saptharishi et al. |
| 8,952,819 B2 | 2/2015 | Nemat-Nasser |
| 9,053,554 B2 | 6/2015 | Uchida et al. |
| 9,079,571 B2 | 7/2015 | Trost et al. |
| 9,081,650 B1 | 7/2015 | Brinkmann et al. |
| 9,111,147 B2 | 8/2015 | Thornton et al. |
| 9,121,713 B2 | 9/2015 | Samarasekera et al. |
| 9,158,962 B1 | 10/2015 | Nemat-Nasser et al. |
| 9,180,887 B2 | 11/2015 | Nemat-Nasser et al. |
| 9,201,932 B2 | 12/2015 | Silver et al. |
| 9,235,750 B1 | 1/2016 | Sutton et al. |
| 9,305,214 B1 | 4/2016 | Young et al. |
| 9,327,743 B2 | 5/2016 | Green et al. |
| 9,358,976 B2 | 6/2016 | Stierlin |
| 9,429,439 B2 * | 8/2016 | Stumper ............... G01C 21/00 |
| 9,439,036 B2 | 9/2016 | Spears et al. |
| 9,491,374 B1 * | 11/2016 | Avrahami ............... H04N 5/247 |
| 9,535,878 B1 | 1/2017 | Brinkmann et al. |
| 9,573,541 B2 | 2/2017 | Graumann et al. |
| 9,679,480 B2 | 6/2017 | Hakeem |
| 9,688,150 B2 * | 6/2017 | Seong ................... B60L 3/0007 |
| 9,718,468 B2 | 8/2017 | Barfield, Jr. et al. |
| 9,734,414 B2 | 8/2017 | Samarasekera et al. |
| 9,734,455 B2 | 8/2017 | Levinson et al. |
| 9,812,016 B2 * | 11/2017 | Oremus ................ G08G 1/165 |
| 9,851,214 B1 | 12/2017 | Chintakindi |
| 9,881,218 B2 | 1/2018 | Ogata et al. |
| 9,892,558 B2 | 2/2018 | Troy et al. |
| 9,928,432 B1 | 3/2018 | Sathyanarayana et al. |
| 2004/0051659 A1 | 3/2004 | Garrison |
| 2006/0106534 A1 | 5/2006 | Kawamata et al. |
| 2006/0186702 A1 * | 8/2006 | Kisanuki ................ B60R 21/36 296/187.04 |
| 2007/0050108 A1 | 3/2007 | Larschan et al. |
| 2008/0243378 A1 | 10/2008 | Zavoli |
| 2010/0312745 A1 | 12/2010 | Tabak |
| 2012/0185091 A1 * | 7/2012 | Field .................... G05D 1/0044 700/254 |
| 2013/0093886 A1 | 4/2013 | Rothschild |
| 2013/0147661 A1 | 6/2013 | Kangas et al. |
| 2014/0049601 A1 | 2/2014 | Pfeil |
| 2014/0297170 A1 | 10/2014 | Sakima et al. |
| 2015/0025917 A1 | 1/2015 | Stempora |
| 2015/0049195 A1 | 2/2015 | Ishigaki et al. |
| 2015/0221136 A1 * | 8/2015 | Shaburova ............... G06T 5/005 345/419 |
| 2015/0254603 A1 * | 9/2015 | Bashkin ................ G06Q 10/087 312/237 |
| 2015/0284001 A1 | 10/2015 | Watanabe et al. |
| 2015/0294422 A1 * | 10/2015 | Carver .................. G06Q 40/08 705/4 |
| 2015/0344030 A1 | 12/2015 | Damerow et al. |
| 2016/0063761 A1 * | 3/2016 | Sisbot ................... B60W 50/14 345/633 |
| 2016/0086021 A1 | 3/2016 | Grohman et al. |
| 2016/0139977 A1 * | 5/2016 | Ashani ................ G06F 11/0706 714/26 |
| 2016/0169690 A1 | 6/2016 | Bogovich et al. |
| 2016/0176397 A1 | 6/2016 | Prokhorov et al. |
| 2016/0244022 A1 | 8/2016 | Lippman et al. |
| 2016/0300242 A1 | 10/2016 | Truong et al. |
| 2017/0011529 A1 * | 1/2017 | Urashita ................ G06T 7/254 |
| 2017/0039630 A1 | 2/2017 | Vanden Berg et al. |
| 2017/0048239 A1 | 2/2017 | Jeon et al. |
| 2017/0053167 A1 | 2/2017 | Ren et al. |
| 2017/0053555 A1 | 2/2017 | Angel et al. |
| 2017/0061222 A1 * | 3/2017 | Hoye ................... G06K 9/00845 |
| 2017/0064363 A1 * | 3/2017 | Wexler ............... G06K 9/00255 |
| 2017/0080900 A1 | 3/2017 | Huennekens et al. |
| 2017/0088142 A1 | 3/2017 | Hunt et al. |
| 2017/0089710 A1 * | 3/2017 | Slusar ...................... B60R 1/00 |
| 2017/0113664 A1 | 4/2017 | Nix |
| 2017/0146801 A1 * | 5/2017 | Stempora ............... G06Q 40/08 |
| 2017/0200061 A1 * | 7/2017 | Julian .................... G06T 11/60 |
| 2017/0221149 A1 * | 8/2017 | Hsu-Hoffman ......... G06Q 40/08 |
| 2017/0292848 A1 * | 10/2017 | Nepomuceno ...... G01C 21/3492 |
| 2017/0293819 A1 | 10/2017 | Deng |
| 2017/0309072 A1 * | 10/2017 | Li .......................... H04L 67/306 |
| 2018/0012085 A1 * | 1/2018 | Blayvas ............... G06K 9/00805 |
| 2018/0107882 A1 | 4/2018 | Ogata et al. |

\* cited by examiner

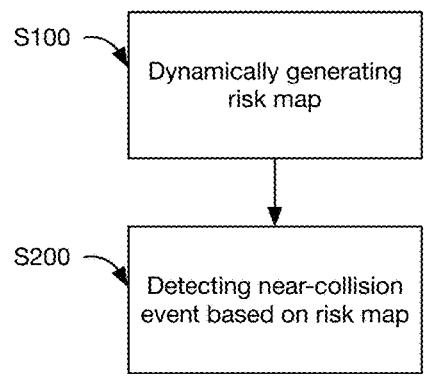
FIGURE 1
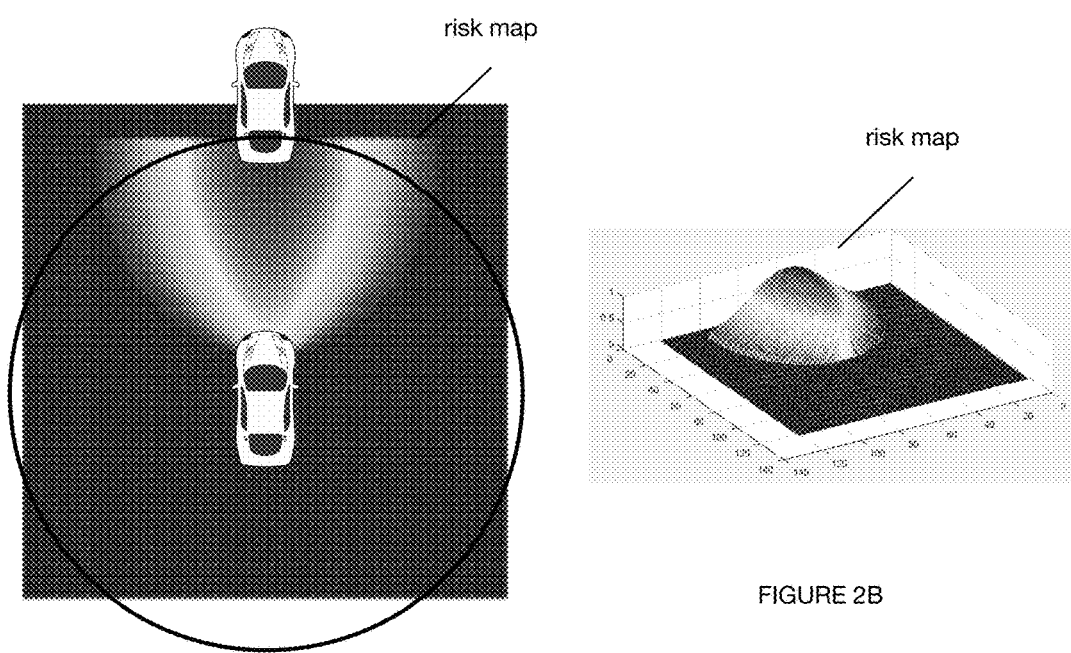
FIGURE 2A
FIGURE 2B

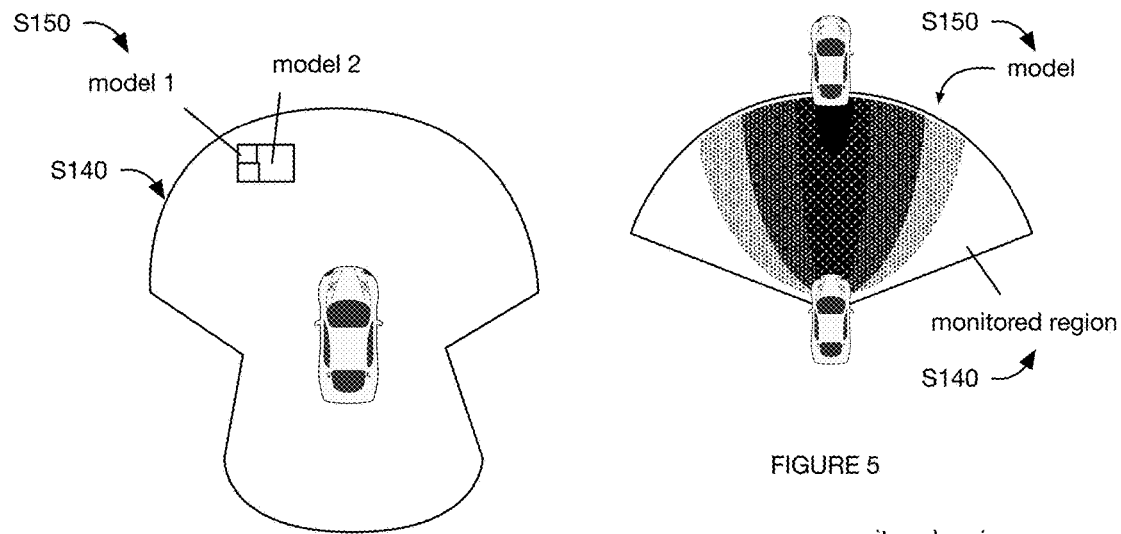
FIGURE 4
FIGURE 5
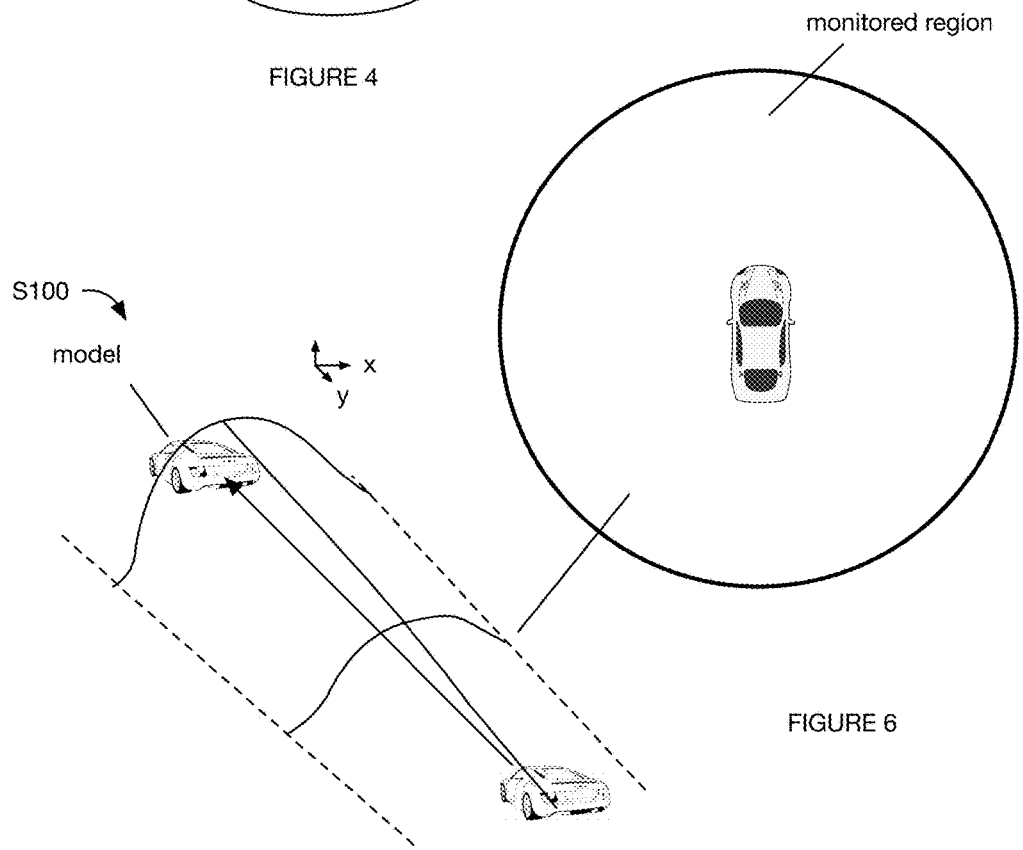
FIGURE 6

SYSTEMS AND METHODS FOR NEAR-CRASH DETERMINATION

CROSS-REFERENCE TO RELATED APPLICATIONS

This application is a continuation of U.S. application Ser. No. 15/705,043 filed 14 Sep. 2017, which claims the benefit of U.S. Provisional Application No. 62/394,298 filed 14 Sep. 2016, and U.S. Provisional Application No. 62/412,419 filed 25 Oct. 2016, each of which is incorporated in its entirety by this reference.

TECHNICAL FIELD

This invention relates generally to the automotive analysis field, and more specifically to a new and useful system and method for near-crash detection in the automotive analysis field.

BACKGROUND

Automotive safety has been a persistent issue ever since automobiles were invented. Historically, attempts at improving automotive safety have been focused on either improving the vehicle itself or disincentivizing poor drivers from driving. The latter has suffered from lack of information—until now, poor drivers could only be identified when a crash had both occurred and been recorded. Poor drivers with risky driving habits that were causing near-collisions (e.g., near-crashed, near-miss) or other unrecorded, high-risk situations (e.g., other's accidents, hit-and-runs) were rarely identified, penalized, or coached. Conversely, good drivers were rarely identified and rewarded.

Thus, there is a need in the automotive analysis field to create a new and useful system and method for near-crash determination. This invention provides such new and useful system and method.

BRIEF DESCRIPTION OF THE FIGURES

FIG. 1 is a flowchart representation of the method of automatically determining a near-collision event.

FIGS. 2A and 2B are a top view and a perspective view of a schematic representation of a risk map.

FIG. 4 is a schematic representation of a risk map including a different risk equation for each sub-region.

FIG. 5 is a schematic representation of a risk map with one model for the monitored region.

FIG. 6 is a schematic representation of a risk map including a continuous function for the monitored region.

DESCRIPTION OF THE PREFERRED EMBODIMENTS

Figure 3:
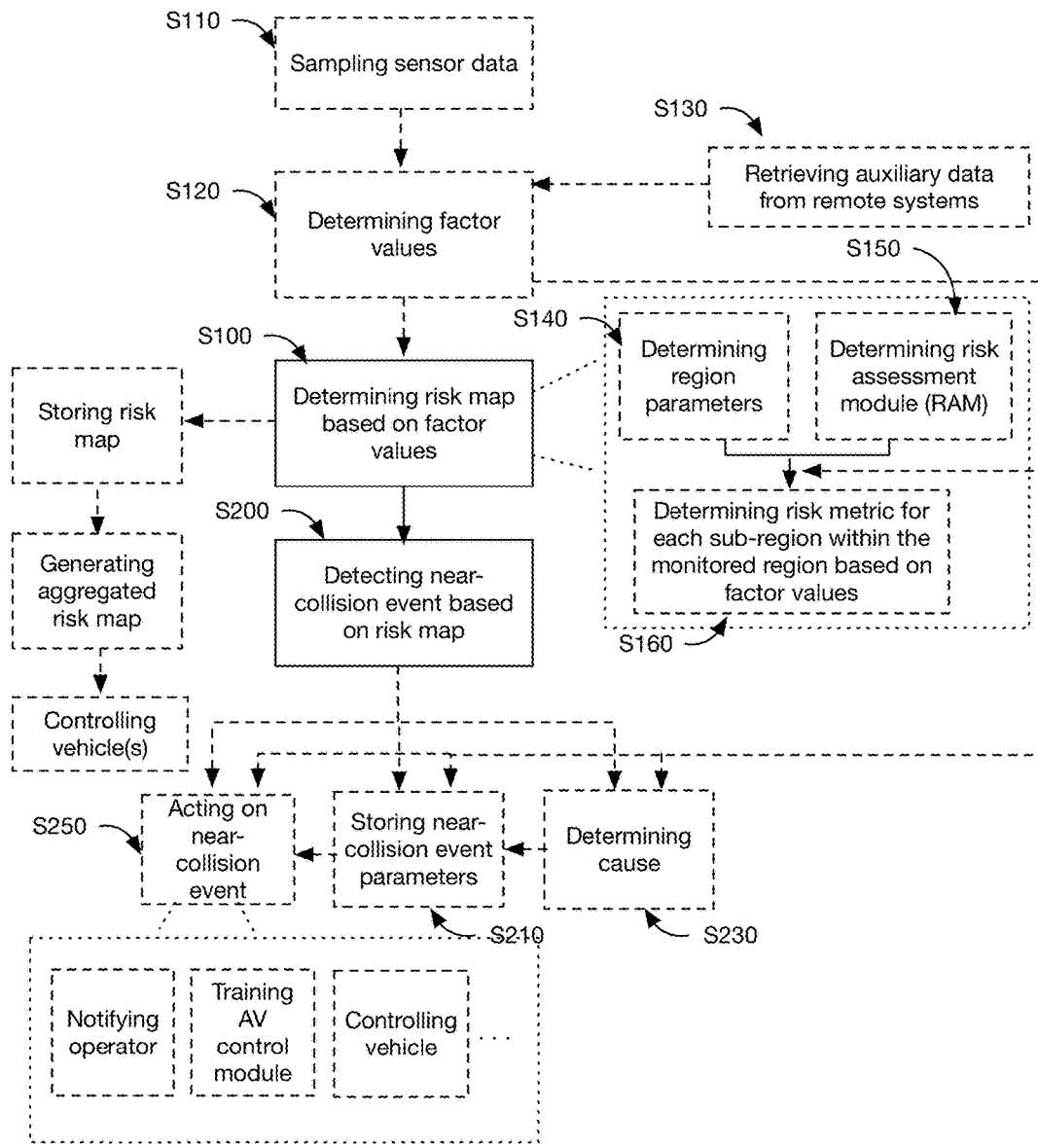
FIG. 3 is a flowchart representation of a variation of the method of automatically determining a near-collision event.
Figure 7:
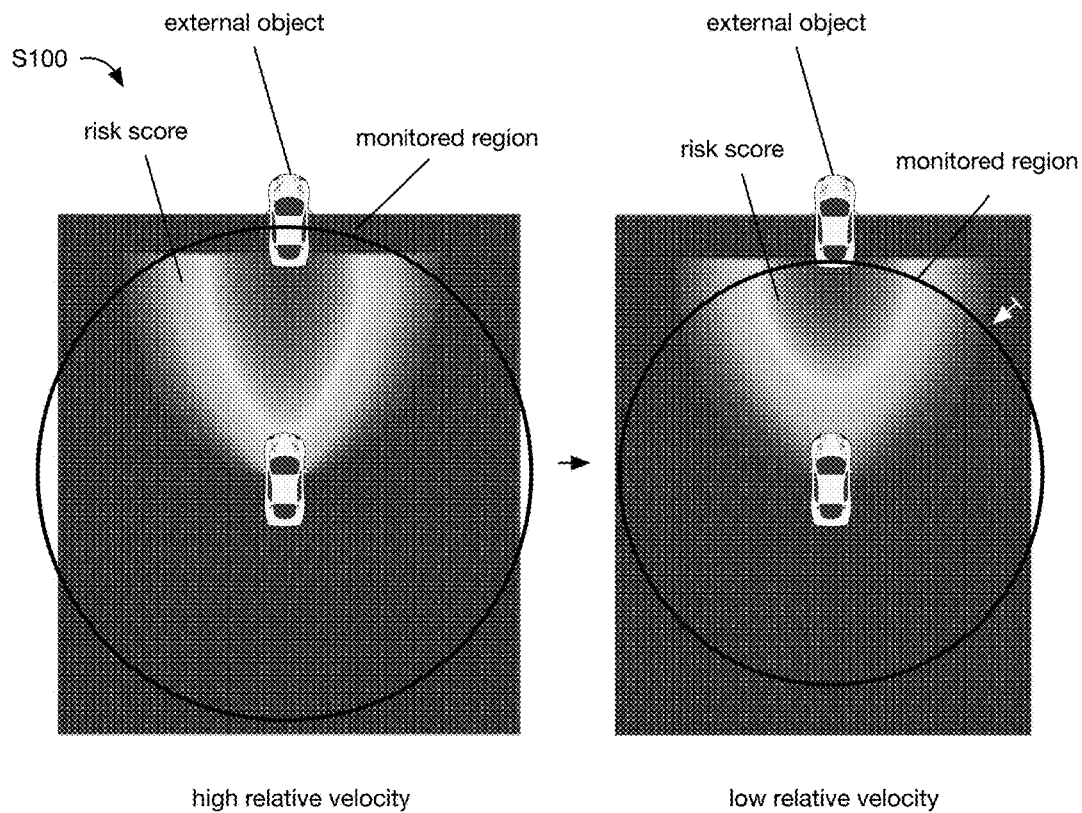
FIG. 7 is an example of how the risk map differs between a risk map for a high relative velocity (between the vehicle and the object) and a risk map for a low relative velocity (between the vehicle and the object).

The following description of the preferred embodiments of the invention is not intended to limit the invention to these preferred embodiments, but rather to enable any person skilled in the art to make and use this invention.

As shown in FIG. 1, the method for near-collision determination includes: determining a risk map for a vehicle S100 and automatically detecting a near-collision event with an object based on vehicle behavior relative to the risk map S200.

The method is preferably performed for a physical vehicle traversing through a physical volume, but can be performed for a virtual model (e.g., of a vehicle) or otherwise performed. The vehicle can be: an automobile, a motorcycle, a bicycle, a skateboard, an aerial system (e.g., a drone, plane, etc.), or be any other suitable vehicle. The vehicle can be driven by a human driver, be automatically controlled, be telematically controlled, or be otherwise controlled. The method is preferably performed for each of a plurality of vehicles, but can alternatively be performed for a single vehicle or any other suitable set of vehicles.

Variants of the method can confer one or more benefits over conventional systems. First, some variants of the method can reduce or conserve the computational resources and/or power consumed. In one example, the method can monitor (e.g., determine risk metrics for) a limited region about the vehicle for near-collision events (e.g., only a region encompassing the anticipated trajectory or direction of travel). In a second example, the same model of the risk assessment module (RAM) can be used in multiple ways (e.g., to both compute risk metric values and used to determine a cause of the near-collision event), which reduces the number of models that need to be run, which, in turn, reduces the computational load. Second, some variants of the method can use a parametric model or equations for risk metric determination, which can be advantageous because: the datasets (e.g., driving history for a given driver) can be relatively small, and a parametric model (or equation) may account for unknown conditions better than a nonparametric model (or neural network). The parametric model can also be advantageous because individual parameters' influence can be determined from the model itself (e.g., to determine cause), and can be better controlled and debugged (e.g., a managing entity can determine why the RAM generated a false positive or negative and correct for the false result). However, the system and method can confer any other suitable set of benefits.

The method is preferably performed in real- or near-real time, but all or portions of the method can alternatively be performed asynchronously or at any other suitable time. The method is preferably iteratively performed at a predetermined frequency (e.g., every millisecond, at a sampling frequency, etc.), but can alternatively be performed in response to occurrence of a performance event (e.g., change in the vehicle attitude, change in user distraction levels, receipt of driving session information, receipt of new sensor information, physical vehicle entry into a geographic region associated with high collision risk, object proximity detection, etc.), be performed a single time for a driving session, be performed a single time for the vehicle, or be performed at any other suitable frequency.

The method is preferably performed by a computing system on-board each vehicle of the plurality of vehicles, but can alternatively be entirely or partially performed by a remote computing system, such as a server system, a user device, such as a smartphone, or by any other suitable set of computing systems. The method is preferably performed using data sampled by the computing system, but can additionally or alternatively be performed using vehicle data (e.g., signals sampled by the vehicle sensors), other vehicles' data (e.g., received from the source vehicle or a remote computing system), aggregate population data, historic data (e.g., for the vehicle, driver, geographic location, etc.), or any other suitable data from any other suitable source.

The computing system can include a processing system (e.g., a set of GPUs, CPUs, microprocessors, TPUs, etc.), storage system (e.g., RAM, Flash), communication system, sensor set, power system (e.g., battery, vehicle power connector, photovoltaic system, etc.), housing, or any other suitable component. The communication system can include telemetry systems (e.g., for vehicle-to-vehicle, vehicle-to-infrastructure, vehicle-to-remote computing system, or other communications), wireless systems (e.g., cellular, WiFi or other 802.11x protocols, Bluetooth, RF, NFC, etc.), wired systems (e.g., Ethernet, vehicle bus connections, etc.), or any other suitable communication systems. The sensors can include: cameras (e.g., wide angle, narrow angle, or having any other suitable field of view; visible range, invisible range, IR, multispectral, hyperspectral, or sensitive along any suitable wavelength; monocular, stereoscopic, or having any suitable number of sensors or cameras; etc.), kinematic sensors (e.g., accelerometers, IMUs, gyroscopes, etc.), optical systems (e.g., ambient light sensors), acoustic systems (e.g., microphones, speakers, etc.), range-finding systems (e.g., radar, sonar, TOF systems, LIDAR systems, etc.), location systems (e.g., GPS, cellular trilateration systems, short-range localization systems, dead-reckoning systems, etc.), temperature sensors, pressure sensors, proximity sensors (e.g., range-finding systems, short-range radios, etc.), or any other suitable set of sensors.

In one variation, the computing system includes a set of internal sensors, a set of external sensors, and a processing system. The internal sensors (e.g., internal-facing camera, microphones, etc.) can be directed toward and monitor the vehicle interior, more preferably the driver volume but alternatively or additionally any suitable interior volume. The external sensors (e.g., exterior-facing camera) are preferably directed toward the vehicle exterior, more preferably toward a region in front of the vehicle (e.g., region preceding the vehicle along the vehicle trajectory, region proximal the driving volume and encompassing the vehicle drivetrain longitudinal vector, etc.), but can alternatively be directed toward the vehicle side(s), top, bottom, rear, or any other suitable region exterior the vehicle. The sensors are preferably statically mounted to the vehicle and/or each other, but can be movably mounted by a gimbal, damping system, or other motion mechanism.

Figure 13A:
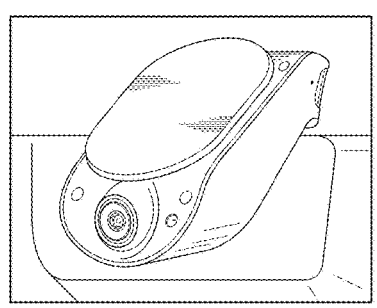
FIGS. 13A and 13B are a front isometric and rear isometric view of an example of the computing system, respectively.
Figure 13B:
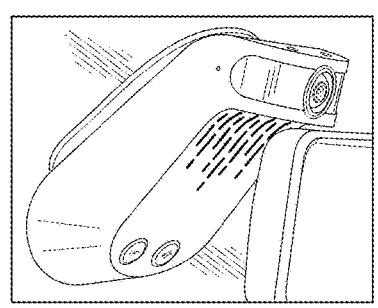
Figure 14A:
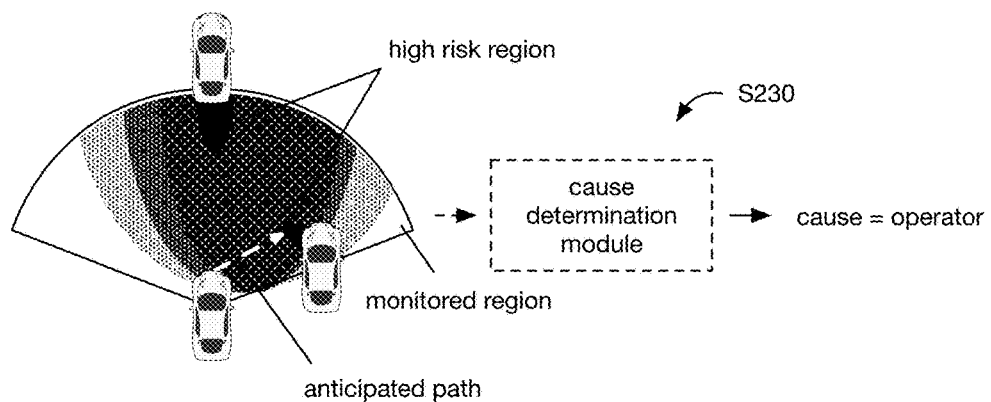
FIGS. 14A and 14B are a first and second example of determining the cause of the near-collision event based on the host vehicle's anticipated trajectory and the external vehicle's kinematics, respectively.
Figure 14B:
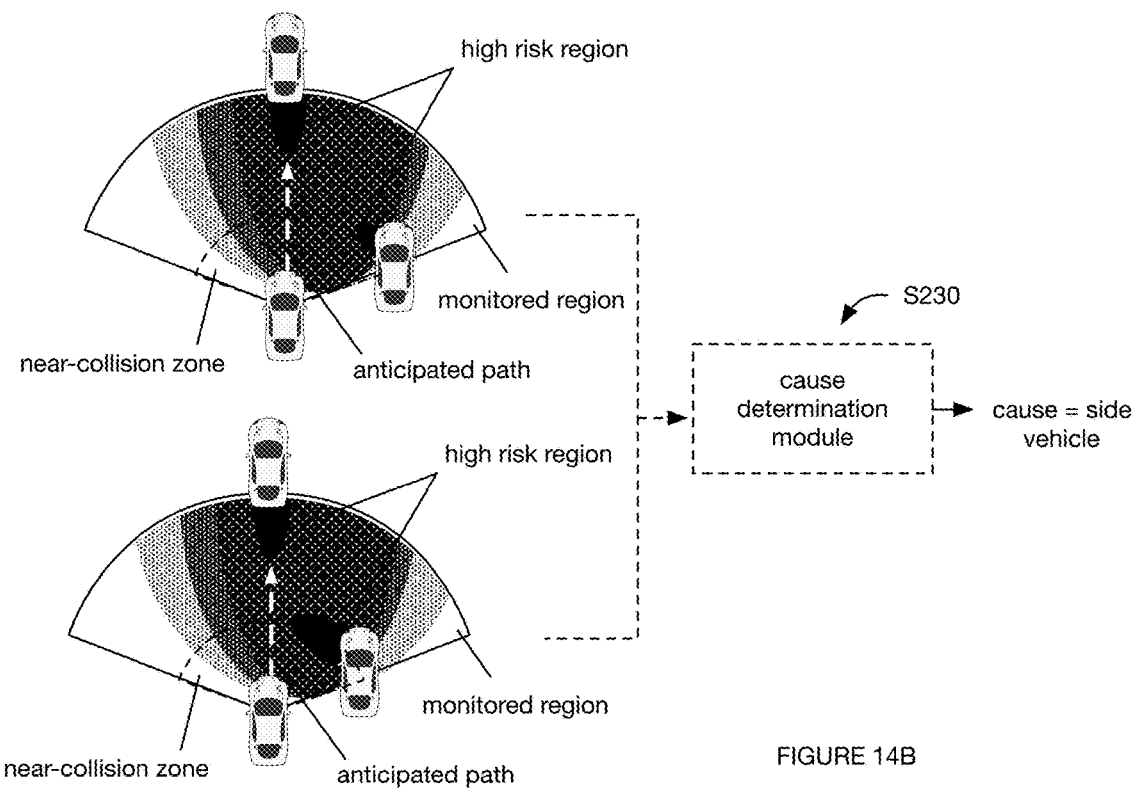

In a specific example (e.g., FIGS. 13A and 13B), the computing system includes an interior-facing camera statically mounted at a known orientation relative to the exterior-facing camera by a common housing and a processor electrically connected to the interior- and exterior-facing cameras, wherein the processor can be arranged within the common housing or outside the common housing. The processor can optionally store a virtual mapping that associates the relative position of one or more points (e.g., pixels) in the exterior-facing camera's field of view (or recorded image) with a position of one or more points (e.g., pixels) in the interior-facing camera's field of view (or recorded image). The interior-facing camera and exterior-facing camera are preferably concurrently operated (e.g., concurrently or synchronously sample interior and exterior images or video, respectively), but can alternatively sample images or video at different rates or times, sample based on the signal values of the other camera (e.g., interior-facing camera sampling is triggered when an external-facing camera condition, such as object detection, is satisfied), or operated at any suitable time. The common housing preferably enables vehicles to be retrofitted with the computing system, but the system can alternatively be integrated into the vehicle. The common housing preferably removably mounts to the computing system to the vehicle, more preferably to the vehicle interior (e.g., along the dashboard, such as proximal the dashboard center region; along the windshield, such as proximal the rear-view mirror; etc.) but alternatively to the vehicle exterior (e.g., along the hood, along the side mirrors, etc.). However, the computing system can be otherwise configured and/or include any suitable set of components in any suitable configuration.

Determining a risk map for a vehicle S100 functions to determine a collision risk for each of a plurality of sub-regions (e.g., locations, positions) within a physical region proximal the vehicle (e.g., monitored region). The risk map (e.g., Safety Assessment Map™ or SAM) is preferably dynamically generated or updated in real-time, near-real time, at a predetermined frequency, or at any other suitable time, but can be predetermined (e.g., static) and retrieved based on a driving parameter value (e.g., driver identifier, vehicle identifier, geographic location, refresh frequency, etc.), or otherwise determined. The risk map is preferably determined by a computing system on-board the vehicle (e.g., a vehicle ECU, vehicle processor, auxiliary processor on the vehicle, etc.), but can alternatively be determined by a remote computing system, a local user device, or by any other suitable system, wherein the sampled sensor signals can be transmitted to the remote system for analysis.

The risk map preferably includes a monitored region and a risk metric for each location or sub-region within the monitored region (example shown in FIGS. 2A and 2B), but can additionally or alternatively include any other suitable information. The risk map preferably moves with the vehicle (e.g., be mobile), but can alternatively be determined for a set of geolocations (e.g., current vehicle location; locations along a vehicle route; platform-specified locations, such as locations with sparse data or highly variable risk), or be associated with any suitable set of locations. The vehicle's geographic location or region can be determined from the vehicle location system (e.g., a GPS system, a RTK-GPS system, a trilateration system, etc.), using a method disclosed in U.S. patent application Ser. No. 15/673,098 filed 9 Aug. 2017 (incorporated herein in its entirety by this reference), or using any other suitable method.

The risk map can be dynamically generated based on parameters of: objects (e.g., external obstacles or objects, proximal objects, etc.), the operator (e.g., driver, teleoperator), vehicle itself, geographic location, the operating context, or any other suitable factor, wherein determining the risk map can include determining the factor values. These factors can additionally or alternatively be used to determine the monitored region parameters (e.g., size, geometry, model types to be used, etc.), the cause of the near-collision event (e.g., elect a cause from a set of candidate causes), or otherwise used.

Figure 8:
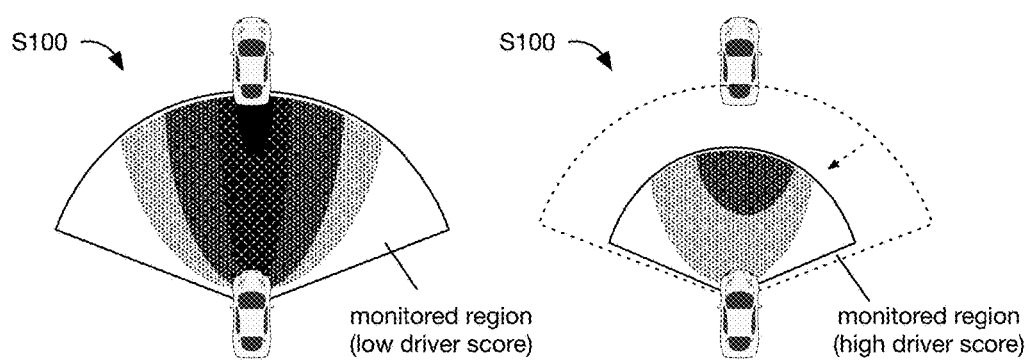
FIG. 8 is an example of how the risk map differs between a risk map based on a high driver score and a low driver score for a similar driving context.

The factors are preferably determined based on sensor signals sampled by the computing system sensors, object sensors, vehicle sensors, or other sensors (wherein the method can include sampling the sensor data S110 and determining the factor values from the sensor signals S120), but can additionally or alternatively be determined based on contextual information (e.g., weather) or any other suitable underlying data, wherein the method can include determining the underlying data. The underlying data (or derivative information, such as summaries, averages, standard deviations, etc.) can be stored (e.g., cached) permanently, temporarily, for a predetermined period of time, or for any other suitable duration by an on-board system (e.g., vehicle, auxiliary system), remote system, or any other suitable system. In one variation, shown in FIG. 8, the underlying data can be cached for a predetermined period of time (e.g., 1 s, 5 s, etc.), preferably by the on-board system but alternatively the remote system, and can be erased if no near-collision event is detected by expiration of the time period, and retained (e.g., in association with the near-collision event) if a near-collision event is detected within the time period (e.g., stored by the recording system or processing system, transmitted to the remote system, etc.). However, the underlying data can be otherwise retained.

Object parameters for the object that can be used to generate the risk map include: the object's presence, pose, kinematics, anticipated behavior (e.g., trajectory, kinematics, etc.), current behavior (e.g., classification, pattern, etc.), classification or type, the object's risk map (e.g., transmitted using V2V or V2X communications), object identifier, associated RAM, associated operator identifier, estimated time to collision (e.g., determined based on object kinematics and/or anticipated trajectory, host vehicle kinematics and/or anticipated trajectory, etc.), or other parameters. Object parameters (and/or associated information) are preferably determined by a processing system on-board the vehicle (e.g., the computing system), but can alternatively or additionally be determined by a remote system. However, the object parameters can be predetermined and be stored by a remote database, by a driver user device, by the vehicle, or otherwise stored, and can be retrieved on-demand, in response to access grant, or otherwise accessed or determined. Different parameters can be determined using the same or different signals (e.g., different instances of the same signal type, signals sampled by different sensors, etc.), retrieved from a remote computing system, or otherwise determined.

The object is preferably a physical obstacle external the vehicle, but can be otherwise defined. The object can be static or mobile. Examples of the object include: other vehicles (e.g., automatic vehicles or manually driven), bicycles, pedestrians, signage, curbs, potholes, or any other suitable obstacle that a vehicle can physically interact with.

The object can be identified: optically (e.g., from images, video, LIDAR, etc.), acoustically (e.g., from recorded sound, ultrasound, etc.), by matching the object's known location (received from the object) with the object's estimated location (determined based on the vehicle's location), from an object identifier (e.g., license plate, wireless identifier such as RFID, beacon identifier, etc.), or otherwise identified.

Object parameters can be determined based on: the vehicle's on-board sensor signals (e.g., proximity sensors, range-finding sensors, cameras, etc.), computing system sensor signals, the object's sensor signals (e.g., wherein the signals or derivative information are transmitted to the processing system for processing), auxiliary sensors (e.g., sensors in the ambient environment configured to monitor object parameters, such as security cameras, in-road weight sensors, etc.), object navigation information (e.g., driving instructions received from a user device associated with the object), models associated with the object (e.g., type, class), historic object behavior, or from any other suitable information. The object parameters can be determined using: pattern matching, computer vision techniques, parametric methods, non-parametric methods, heuristics, rules, decision trees, Naïve Bayes, Markov, neural networks, genetic programs, support vectors, or any other suitable method.

A first variation of determining object parameters can include detecting the object within one or more images recorded by an external-facing camera (e.g., still images, video, etc.). The object can be detected using: sensor fusion (e.g., wherein a proximity sensor indicates the object presence and position, and segments of the image corresponding to the object position are used to confirm or determine the object parameters, etc.); object recognition (e.g., wherein the object detected in the image is one of a set of predetermined or learned objects; classification; regression; pattern matching; etc.); object identification; image detection (e.g., image data is scanned for an object condition); scene matching (e.g., an object is detected by comparing the image to a reference image of the same scene for the same geographic location); or any other suitable method. Examples of object recognition approaches that can be used include: a geometric approach; photometric approach; a neural network (e.g., CNN); object model-based methods (e.g., edge detection, primal sketch, Lowe, recognition by parts, etc.); appearance-based methods (e.g., edge matching, divide and conquer, grayscale matching, gradient matching, histograms of receptive field responses, HOG, large model bases); feature-based methods (e.g., interpretation trees, hypothesize and test, pose consistency, pose clustering, invariance, geometric hashing, SIFT, SURF, bag of words representations, Viola-Jones object detection, Haar Cascade Detection); genetic algorithms; or any other suitable approach. In a first example, detecting the object can include generating a HOG image from the frame (e.g., using a global analysis module, object-specific analysis module), matching the extracted HOG pattern with a predetermined HOG pattern for a set of objects, projecting and/or posing the objects (e.g., using object landmark estimation, affine transformation, and/or other feature identification methods or transformations), encoding the image using an embedding or set of measurements (e.g., using a CNN trained on images of the object(s)), and identifying an object based on the embedding values (e.g., using a classifier, such as a SVM classifier). In a second example, determining the object type includes: extracting an object shape from the sensor measurements and classifying the object shape to determine the object type. However, the object can be otherwise detected and/or identified. The object can be given a number, associated with a specific equation, associated with a specific parametric weight, or otherwise influence risk score calculation.

A second variation of determining object parameters can include determining the object pose (e.g., relative position, distance, angle, orientation, etc. relative to the camera, vehicle, or sensor) using pose estimation techniques from images recorded by the external-facing camera. The pose is preferably determined using analytic or geometric methods (e.g., using a set of known object geometries retrieved based on the detected object class or type, object markings such as vehicle badging, or other features), but can alternatively be determined using genetic algorithm methods, learning-based methods, or any other suitable method. The matched object geometries or libraries can be: all available object geometries, geometries for objects associated with the driving context (e.g., no human geometries or modules for images recorded on a highway), or otherwise limited. For example, a HOG image, generated from an image region with a high probability of including a projection of a vehicle, can be matched to predetermined HOG patterns for a set of poses for a vehicle (e.g., generic vehicle, specific vehicle make and model, etc.), wherein the pose associated with the matched predetermined pattern can be assigned to the detected vehicle. In a second example, the external-facing cameras are a stereo camera pair, wherein the object distance from the vehicle can be determined based on the disparity between the images recorded by the stereo camera pair. However, the object pose, or elements thereof, can be otherwise determined.

A third variation of determining object parameters can include determining object kinematics. This can include applying motion estimation methods to the images (e.g., external videos, first video, etc.) recorded by the external-facing camera, such as direct methods (e.g., block-matching techniques, phase correlation and frequency domain methods, differential methods, such as Lucas-Kanade, Horn-Schunck, Buxton-Buxton, Black-Jepson, variational methods, discrete optimization methods, pixel recursive algorithms, optical flow methods, etc.), indirect methods (e.g., corner detection, RANSAC, etc.), or any other suitable method; using radar or another range-finding system; or otherwise determined. In one example, determining object kinematics includes: identifying the object in a first sensor signal frame (e.g., image, video frame); tracking the objects across multiple subsequent frames; determining the relative object trajectory and/or kinematics (e.g., acceleration, velocity) based on the relative object location within each frame and each frame's timestamp; determining the host vehicle trajectory and/or kinematics associated with each frame (e.g., based on concurrently-recorded orientation sensor data, based on optical flow techniques, etc.); and determining the object kinematics based on the relative object kinematics and the host vehicle kinematics. In a second example, determining the object kinematics includes: extracting a motion pattern from a series of images, and determining the kinematics parameter values by classifying or pattern matching the motion pattern. However, the object kinematics can be determined based on the vehicle's kinematics (e.g., measured using the auxiliary system, the user device, received from the vehicle, etc.), the object's kinematics (e.g., received from the object, estimated from sequential sensor measurements of the object, etc.), or be otherwise determined. However, the object trajectory or kinematics can be otherwise determined.

A fourth variation of determining object parameters can include determining the anticipated behavior of the object. The anticipated behavior can be determined based on historic behavior for the object (or similar objects), pattern recognition, predetermined behaviors mapped to the object parameter values, predetermined behaviors mapped to precipitating factors detected in the sensor signals, or using any other suitable data or method. In one embodiment, determining the object's anticipated behavior includes retrieving an anticipated behavior for the object based on object parameters, such as object class or object pose. For example, a leading vehicle can be expected to move forward at the speed limit or a historic speed for the vehicle (e.g., retrieved using the vehicle's license plate number). In another example, a pedestrian at an intersection that is looking at the host vehicle (e.g., based on eye tracking methods run on the external image) can be anticipated to cross the street. In a second embodiment, pattern recognition methods can be applied to the object's historic path (e.g., as determined from a series of sensor measurements), wherein the object's anticipated motion can be determined from the recognized pattern. In a third embodiment, the object's historic behavior for the same location or a similar driving context (e.g., similar weather conditions, number of intersections, distribution of objects, etc.) can be used as a proxy for the object's anticipated behavior. In a fourth embodiment, the object's anticipated motion can be a predetermined anticipated motion mapped to a precipitating factor extracted from the sensor signal. Precipitating factors can include ego-motion (e.g., actions), indicators, V2V communications, or any other suitable factor that are associated with initiation of object movement. Examples of precipitating factors include: visual indicators, such as lead vehicle brake light operation (e.g., associated with lead vehicle deceleration, determined from a front-facing sensor stream, etc.), external vehicle turn indicator operation or turned wheels (e.g., associated with external vehicle translation toward the side associated with the turn indicator or wheel turn), swerving (e.g., associated with higher external vehicle trajectory uncertainty), pedestrian body part into the intersection (e.g., associated with pedestrian street crossing); sensor signal patterns (e.g., external vehicles' steering wheel position sensor signals, brake position, accelerator position, selected gear, etc.); or any other suitable precipitating factor. The precipitating factor and corresponding anticipated motion can be manually associated, automatically associated (e.g., learned using a supervised or unsupervised training set), or otherwise determined. However, the object's anticipated motion can be determined from the external vehicle's navigation system (e.g., from an app on the driver's user device, from a central navigation system, etc.), from the control algorithm used by the vehicle OEM, from the external vehicle itself, from the most probable paths historically taken by objects in that location or region, or otherwise determined.

A fifth variation of determining object parameters can include determining the object parameter from secondary sensor information (e.g., proximity sensor information, range-finding information, radar information, etc.) recorded within a predetermined time window of image recordation. Parameter values extracted from different sensor sources for the same object can be correlated using odometry, timestamps, or any other suitable association. However, the object parameters can be otherwise extracted or determined.

Operator parameters (user parameters) that can be used to generate the risk map include: operator profiles (e.g., history, driver score, etc.); operator behavior (e.g., user behavior), such as distraction level, expressions (e.g., surprise, anger, etc.), responses or actions (e.g., evasive maneuvers, swerving, hard braking, screaming, etc.), cognitive ability (e.g., consciousness), driving proficiency, willful behavior (e.g., determined from vehicle control input positions), attentiveness, gaze frequency or duration in a predetermined direction (e.g., forward direction), performance of secondary tasks (e.g., tasks unrelated to driving, such as talking on a cell phone or talking to a passenger, eating, etc.), or other behavior parameters; or any other suitable operator parameter. The operator can be the operator of the host vehicle, the operator of the object(s) or vehicle(s), or be any other suitable operator.

The operator behavior can be characterized as a behavior class or type, a behavior score (e.g., calculated based on the operator distraction level, expressions, etc.), or otherwise characterized. The operator behavior is preferably determined from the operator-monitoring sensor signals (e.g., internal-facing camera video), but can be backed out of the determined vehicle ego-motion or otherwise determined. The operator behavior can be identified and/or characterized using rules (e.g., within a time window from the near-collision event), heuristics, decision trees, support vectors, probabilitistics (e.g., Naïve Bayes), neural networks, genetic programs, pattern matching (e.g., patterns of one or more sensor data sets), or any suitable method. The operator profile can be the driver profile associated with a vehicle identifier for the respective vehicle (e.g., external vehicle, host vehicle), wherein the vehicle identifier can be determined from sensor measurements recorded by sensor on-board the vehicle (e.g., license plate number extracted from the external-facing camera), the vehicle identifier associated with the computing system, or otherwise determined; be the operator profile associated with a geographic location collocated with the object; be the operator profile associated with the driving session or timeframe (e.g., a scheduled driver for the vehicle); be the operator profile associated with a user identifier (e.g., dongle identifier, user device identifier, face, etc.), or be any other suitable operator profile. The operator profile is preferably automatically generated based on historic vehicle operation data (e.g., recorded during past driving sessions), such as past risk maps, but can alternatively be manually generated (e.g., by the operator, by a fleet or system management entity) or otherwise generated. The operator profile can include the operator's risk score (e.g., calculated based on past risk maps, near-collision history, tailgating history, distraction history, collision history, etc.), routes, operator identifier, operator driving schedule, RAM, or any other suitable information.

Figure 12:
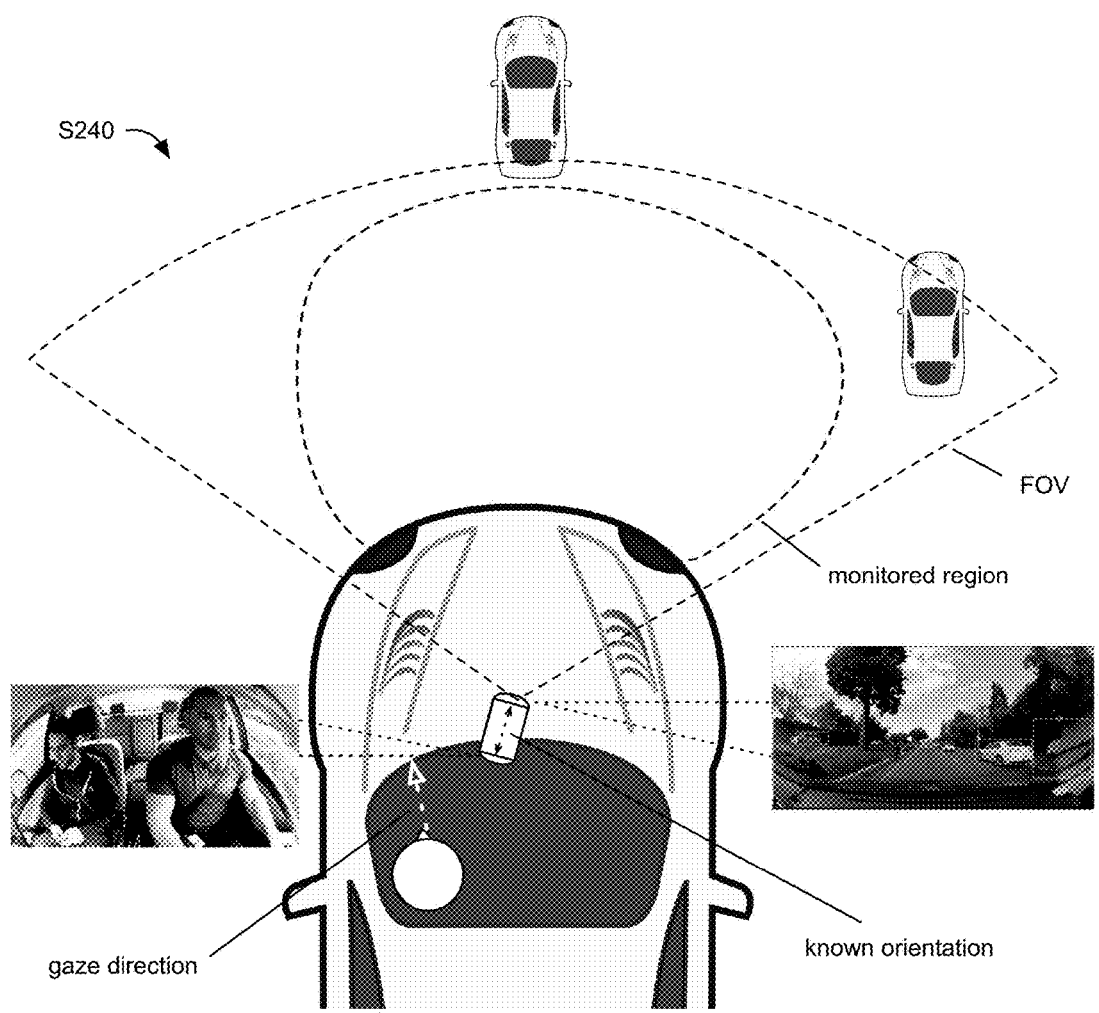
FIG. 12 is an example of determining driver attention and gaze direction.

The operator behavior can be determined from sampled signals monitoring the vehicle interior, or be otherwise determined. In one variation, the operator behavior can be determined from images recorded by an interior-facing camera (e.g., interior video, second video, etc.). The interior-facing camera is preferably directed toward the driver volume, but can alternatively be directed toward the entirety of the interior, or to any suitable volume. In one example, operator attention to a detected object can be determined based on an operator's gaze direction relative to the object (e.g., whether the operator is looking at the object) based on the interior-facing sensor signals, the exterior-facing sensor signals, and the known relative orientation of the interior- and exterior-facing sensors. In a specific example (e.g., FIG. 12), the operator attention can be determined by: determining the operator gaze direction relative to the vehicle (e.g., using eye tracking methods) from the interior image, determining the exterior object position relative to the vehicle from the exterior image, mapping the operator gaze direction to an exterior gaze region using the known relative orientation between the interior-facing camera and exterior-facing camera, assigning a high attention score (or determining that the operator has seen the object) when the exterior gaze region encompasses the exterior object position(s). However, the operator attention can be otherwise determined. In a second variation, the interior images can be analyzed for operator emotion (e.g., surprise) using emotion expression recognition techniques. In a third variation, the sensor signals or vehicle control input positions can be analyzed for patterns indicative of operator behavior (e.g., swerving, sudden braking, etc.). However, the operator behavior can be otherwise determined.

Vehicle parameters that can be used to determine the risk map can include: vehicle kinematics (e.g., acceleration, jerk, velocity, etc.), mass, class, make or model, wear, age, control input position (e.g., brake position, accelerator position, transmission position, etc.), current geographic location (e.g., using on-board location systems), past geographic locations or driving route, anticipated driving route (e.g., determined from a navigation system, historic routes, etc.), vehicle position relative to lane markings or other road markings, or other vehicle parameters. Vehicle kinematics can be determined using optical flow methods, on-board kinematic sensors such as accelerometers or IMUs, location sensors, or otherwise determined. Vehicle parameters can be pre-associated with the computing system or set of sensors monitoring the driving session, be vehicle parameters associated with a vehicle identifier for the host vehicle, be parameters determined based on sensor signals sampled during the driving session, or be otherwise determined.

Geographic location parameters that can be used to generate the risk map include: the location's risk profile (e.g., collision risk map associated with the geographic location or region), the location's traffic regulations (e.g., speed limit, retrieved from a database, etc.), the location's traffic conditions (e.g., determined from the density of computing systems located in the region, from historic traffic, etc.), the road type (e.g., urban, highway, etc. determined based on the vehicle location and a database, etc.), the road condition or construction (e.g., determined from public reports, historic driver reports, inferred from other drivers' sensor data, etc.), roadway infrastructure, traffic signs (e.g., determined from a predetermined map, from images sampled by the external-facing camera, etc.), road markings (e.g., lane markings, etc.), the RAM associated with the location, or any other suitable geographic location information. In a specific example, intersections can be associated with different risk assessment models from highways. The geographic location is preferably the host vehicle's current geographic location (e.g., determined by on-board location systems), but can alternatively be the host vehicle's past or anticipated geographic location, or be any other suitable geographic location. The geographic location parameters can be retrieved from a remote database (e.g., from the remote computing system), stored on-board the computing system, or be otherwise accessed. The geographic location parameters can be determined in real- or near-real time (e.g., based on on-board sensor signals, V2X communications, etc.), asynchronously, or otherwise generated. The geographic location parameters can be manually generated, automatically generated (e.g., based on one or more vehicles' operation parameters, aggregated from multiple vehicles or passes), generated from maps, or otherwise determined.

Operating context parameters that can be used to determine the risk map include: traffic density, time of day, weather, ambient lighting, wheel traction, visual obstructions, or any other suitable contextual parameter. The contextual parameter can be retrieved from an external database S130, measured using on-board sensors, or otherwise determined. Operating context parameters can optionally include computing system operational parameters, such as available computational power, available power (e.g., the computing device battery's state of charge), available memory, or any other suitable parameter.

The risk metric is preferably indicative of a collision risk for each sub-region within the monitored region, but can additionally or alternatively be indicative of the probability of a collision within the respective sub-region, the vehicle's safety within the respective sub-region, or be indicative of any other suitable parameter. The risk metric can be a continuous function extending across multiple locations within the monitored region (examples shown in FIG. 6), be a discrete score for each discrete sub-region (example shown in FIG. 4), or be otherwise determined. For example, the risk assessment module (RAM) can include an equation, wherein only the risk score for a location proximal the external object can be calculated using the equation. Risk scores for other sub-regions within the monitored region can be calculated in response to the first risk score exceeding a threshold value. The risk metric can be aligned with the region orientation or otherwise oriented. The risk metric can be updated: in real- or near-real time (e.g., as sensor data is sampled or received, as factor values are determined, etc.), at a predetermined frequency, in response to occurrence of a predetermined event (e.g., object entering the monitored region), be static (e.g., predetermined), or be determined at any other suitable time. The risk metric for each sub-region is preferably determined based on one or more of the factors discussed above, but can be otherwise determined. The risk metric can be determined: heuristically, using a predetermined rule, calculated (e.g., using an equation), using an artificial neural network (e.g., CNN, DNN, etc.), decision tree, clustering, Bayesian network, or be otherwise determined.

However, the risk map can be determined in any suitable manner using any other suitable set of factors.

The monitored region is preferably a physical volume or area proximal the vehicle that is monitored for near-collision events, but can be otherwise defined. The monitored region is preferably virtually monitored, but can alternatively or additionally be physically monitored (e.g., using on-board vehicle sensors), or otherwise monitored. Virtually monitoring the monitored region preferably includes generating a virtual risk map encompassing a virtual region corresponding to the physical region, but can alternatively or additionally include a virtual scene representing the physical region (e.g., including representations of the detected objects), a risk score for the entire physical region, a risk vector (e.g., denoting the direction of highest collision risk(s) for the vehicle), or otherwise virtually monitoring the monitored region.

The monitored region (and/or virtual region, wherein monitored region descriptions can hereinafter also apply to virtual regions) can be associated with region dimensions, region pose (e.g., relative to the vehicle, an object, a non-vehicle point), or any other suitable region parameter. The monitored region can optionally be associated with a risk point distribution, RAM(s), or any other suitable data.

The region dimensions can influence how early a precipitating event (e.g., near-collision event, event preceding the near-collision event) is detected. The region dimensions can additionally or alternatively influence which objects are considered in the risk assessment. For example, objects outside of the monitored region can be disregarded. The region can be 2D, 3D, 4D (e.g., spatiotemporal), or have any suitable number of dimensions. The region dimensions can include: a region geometry (e.g., shape), area, critical dimension (e.g., radius, height), or other suitable set of dimensions. The region geometry is preferably a circle or sphere but can alternatively be a conic section, polygon, sector, cone, pyramid, prism, amorphous, or have any other shape. The region can be symmetric or asymmetric in one or more axis (e.g., x, y, z).

The monitored or virtual region pose (e.g., position and/or orientation) relative to the vehicle functions to limit the area or volume of monitored space. The monitored region can encompass the vehicle (e.g., surround the vehicle, be centered about the vehicle, be offset from the vehicle, etc.), extend from the vehicle, abut or be adjoined with the vehicle, trace a vehicle profile, be next to the vehicle (e.g., touching the vehicle, be separated from the vehicle by a non-zero distance), or otherwise related to the vehicle. In one example, the region can be separated from the vehicle by a distance substantially equal to proximity sensor(s)' sensitivity distance(s), wherein the computing system can be used to monitor collision risk for distal obstacles and the proximity sensors used to monitor collision risk for proximal obstacles. The monitored region preferably encompasses a subset of the volume surrounding the vehicle, but can alternatively encompass the entirety of the volume surrounding the vehicle, the entirety of the superterranian volume surrounding the vehicle, or encompass any suitable volume. In one example, the monitored region excludes a region proximal the vehicle rear. In a second example, the monitored region encompasses a region preceding (or in front of) the vehicle. In a third example, the monitored region encompasses a region encompassing the possible host vehicle trajectories (e.g., immediately possible, trajectories possible within a predetermined time duration, which can be selected based on the vehicle kinematics, etc.). In a fourth example, the region is defined by a predetermined geo-fence. However, the monitored region can be otherwise positioned relative to the vehicle. The monitored region can additionally or alternatively encompass, be adjacent to, or otherwise be physically associated with the object(s).

The region orientation is preferably aligned (e.g., centered, parallel, coaxial, etc.) along the instantaneous or anticipated direction of host vehicle travel, but can alternatively be aligned with the vehicle centerline (e.g., longitudinal centerline), aligned with a predetermined vector relative a vehicle reference point (e.g., relative to the longitudinal centerline), aligned with a vector representing the highest risk trajectory, or otherwise aligned. The instantaneous or anticipated direction of host vehicle travel can be determined from: the steering wheel position, the wheel (e.g., tire) positions, past kinematic data (e.g., sampled within a predetermined time window with the kinematic sensors), optical flow data (e.g., from images sampled by the cameras), navigation information (e.g., retrieved from an operator user device, vehicle control instructions, etc.), historic route information (e.g., for the operator, vehicle, etc.), or otherwise determined. The instantaneous or anticipated direction of host vehicle travel can be determined using: pattern matching, rules, decision trees, Naïve Bayes, neural networks, genetic programs, support vectors, or any other suitable method.

The risk point distribution functions to specify the sub-regions (e.g., points, sub-areas, sub-volumes, etc. and/or locations thereof) within the monitored region for which risk values will be determined. The sub-regions (for which risks are determined) can have the same or differing geometry, size, or other parameter. The risk point distribution preferably forms a continuous space (e.g., topological, volumetric), but can alternatively or additionally form a discrete space e.g., topological, volumetric), form a partially continuous and partially discrete space, or any other suitable space. The risk point distribution within the discrete space can be uniform, random, non-linear (e.g., quadratic, logarithmic, exponential, etc.), linear, a single sub-region, or otherwise distributed. For example, the risk point distribution can have a higher point density proximal the vehicle, higher point density proximal the anticipated trajectory, have a point density that varies as a function of the collocated or respective risk score, etc.), or have any suitable distribution. The risk point distribution can be determined based on the monitored region parameters (e.g., different distributions for different parameter value combinations), RAM, the factor value(s), be a default distribution, or be otherwise determined. Additionally or alternatively, the region may not include a risk point distribution, and include a binary determination (e.g., whether an object is detected within or anticipated to enter the monitored space), a risk score for the monitored space, a risk vector (e.g., summed from the risk vectors associated with the factor values), or be associated with any other suitable risk metric.

The monitored region parameters can be dynamically adjusted (e.g., based on up-to-date sensor information), static, or otherwise determined S140. The monitored region parameters can be universal, specific to a combination of factor values, specific to an operator or vehicle, or otherwise shared. The region parameters are preferably determined based on factor values (e.g., from signals sampled within a time window of region parameter determination, such as several seconds or minutes), but can be otherwise determined. Dynamically adjusting the monitored region parameters can function to reduce or conserve the computational power while monitoring the physical areas that should be monitored for collisions, given the context. This can function to reduce overall power consumption, which can be desirable in applications where the processing system is powered using batteries or another limited power source (e.g., in an auxiliary, battery-powered system, in electric vehicles, etc.). The monitored region parameters can be determined: heuristically, using a predetermined rule, calculated, using an artificial neural network (e.g., CNN, DNN, etc.), decision tree, clustering, Bayesian network, or otherwise determined. The monitored region parameters can be determined based on sensor signals (e.g., images, accelerometer data, vehicle sensor data, etc.), driver profiles (e.g., historic habits, risk score), location data (e.g., traffic regulations, road type, road condition, etc.), object behavior (current or anticipated), derivative information thereof, or based on any other suitable information.

The region dimensions can be static (e.g., predetermined) or be variable. In the latter variant, the region dimensions can be selected (e.g., from a predetermined library associating factor and dimension values) or calculated based on the values of one or more of the factors described above, as a function of time, as a function of near-collision event frequency, as a result of the RAMs used for risk map generation (e.g., wherein the RAMs are each associated with a set of region dimensions, wherein the resultant region dimensions are an aggregate of said dimensions), or vary in any other suitable manner. For example, the region dimensions can change as a function of host vehicle speed (e.g., increase with increased vehicle speed), vehicle geographic location (e.g., wherein each geographic location or associated collision risk map or score can be associated with a set of region dimensions), anticipated object behavior (e.g., for the lead vehicle, adjacent vehicle, pedestrian, etc.), or any other suitable factor.

In a first example, the region size or area can increase with increased geographic risk. In a second specific example, the region shape can be adjusted (or a new shape selected) to be biased toward the right when the lead vehicle is anticipated to move right (e.g., based on right indicator operation). In a third example, the monitored region size increases with the vehicle's velocity, road speed limit, road type (e.g., increases for highways, decreases for urban streets), and driver risk, and decreases with increased traffic along the route. In a specific example, the method includes determining a following distance for the driver based on the instantaneous parameter values, and sets the monitored region size at the determined following distance. In a fourth example, the number of sub-regions within the monitored region for which risk scores are determined decreases with increased velocity, and the area encompassed by each sub-region increases. In a third example, the monitored region shape changes based on the location's profile. In a specific example, the monitored region shape can be a circle for locations with high side impact frequencies or slow side traffic (e.g., pedestrian or bicycle traffic), and be a sector for locations with low side impact frequencies (e.g., highways). In a fourth example, the monitored region size increases with the driver's risk score. However, the monitored region parameters can be otherwise determined.

Determining the risk map S100 can include determining a risk metric for the monitored region S160. The risk metric can be determined for the entire monitored region, one or more sub-regions of the monitored region (e.g., a risk point), or for any other suitable region. The risk metric is preferably a risk score, but can be a risk probability or be any other suitable metric. The risk metric is preferably determined by a RAM, but can be determined by any suitable system.

The risk map can be: an array of risk metric values (e.g., for each sub-region identifier), a heat map (e.g., stored or visualized as a heat map), an equation, or be otherwise structured. The risk map(s) or parameters thereof (e.g., RAM, factor values, weights, geolocations, etc.) can be stored temporarily (e.g., long enough to analyze the instantaneous risk), for the driving session duration, for longer than the driving session, or for any suitable time. All or a subset of the generated risk maps or parameters thereof can be stored. The risk maps (or parameters thereof) can be stored in association with the respective vehicle identifier, geographic location or region identifier, operator identifier, vehicle kinematics, or any other suitable factor values.

The risk assessment module (RAM) associated with the monitored region functions provide a model or method to determine the risk metric for the monitored region. The RAM preferably determines a risk score for each risk point within the risk point distribution (e.g., populate the risk map), but can alternatively or additionally determine a risk score for a subset of the risk points within the distribution, a risk score for the monitored region, a risk score for the instantaneous driving context, or any other suitable risk metric for any other suitable region or context. Each risk point within a monitored region can be associated with the same RAM (e.g., FIG. 5) or different RAMs (e.g., FIG. 4). The RAM preferably includes a continuous function, but can alternatively or additionally include a discretized function or any other suitable function. The RAM preferably includes a parametric model (e.g., be a parametric module), but can alternatively be a nonparametric model, semi-parametric model, semi-nonparametric model, or include any other suitable model. The RAM can include one or more models. The RAM preferably includes a set of equations (e.g., one or more probability distributions), but can alternatively be a neural network (e.g., CNN), support vector, decision tree, set of rules, classifier (e.g., Bayesian classifier), genetic program, or be otherwise structured. For example, the RAM can include: a discrete probability distribution, a continuous probability distribution, normal distribution (e.g., Gaussian distribution, such as a 2D Gaussian or 3D Gaussian, multivariate normal distribution, etc.), log-normal distribution, Pareto distribution, discrete uniform distribution, continuous uniform distribution, Bernoulli distribution, binomial distribution, negative binomial distribution, geometric distribution, hypergeometric distribution, beta-binomial distribution, categorical distribution, multinomial distribution, Tweedie distribution, Poisson distribution, exponential distribution, gamma distribution, beta distribution, Rayleigh distribution, Rice distribution, or any other suitable risk determination model. The risk distribution can be centered or have an apex at the external object, at the vehicle, or at any other suitable location. In one example, the risk model includes an equation with a set of weighted factors. However, the model can be otherwise configured. The RAM can include one or more models. Each monitored region can be associated with one or more RAMs at a given time, and can be associated with the same or different RAMs over time (e.g., over a driving session).

The RAM preferably uses the factor values to determine the risk, but can alternatively use other values. For example, the risk for each sub-region of the risk map can be determined based on the object parameters and the operator behavior score. However, the risk for each sub-region can be otherwise determined.

Each RAM is preferably static, but can alternatively be dynamically adjusted (e.g., in real- or near-real time, as factor values are determined, etc.), adjusted at a predetermined frequency, adjusted in response to occurrence of an event (e.g., through an update), or otherwise adjusted, wherein the method can include generating the RAM. The RAM (e.g., models, weights, factors, etc. therein) can be manually generated, automatically generated (e.g., using supervised or unsupervised learning, such as using a set of time-series data labeled with near-collision labels or collision labels, etc.), generated using a neural network or other machine learning algorithm, generated empirically or heuristically, dynamically generated (e.g., wherein factor weights are populated based on a secondary factor's value), or otherwise determined.

The system can include a universal RAM or multiple RAMs, wherein different RAMs can be associated with different monitored regions (e.g., type, class), monitored region parameters (e.g., shape, size, orientation, bias), operator profiles, vehicle profiles, computing systems, geographic locations or regions (e.g., geo-fences), object parameters, driving contexts, specific values for other factors, specific factor value combinations (e.g., scenario class, register, etc.), or any other suitable set of data. When the system includes multiple RAMs, the method can include determining the RAM.

In a first variation, a single RAM (e.g., equation) can be used to calculate all risk scores (e.g., risk maps) in all registers (e.g., contexts).

In a second variation, different RAMs are used to calculate risk metrics (e.g., risk maps) in different registers and/or overlaid when different registers concurrently occur. The RAM to be used is preferably determined based on the factor value(s), but can be determined based on the monitored region parameter(s) or otherwise determined. The factor values used to determine which RAM to use can be the same or different factors as those fed into the RAM to determine the risk metric (e.g., risk maps). The RAM is preferably selected from a predetermined library based on one or more factor values (e.g., wherein the risk metric is determined for each sub-region within the monitored region using the selected RAM), but can alternatively be dynamically generated (e.g., model type(s) selected; weights calculated, selected, or otherwise determined; etc.), or otherwise determined S150. In a first embodiment, the RAM is selected based on the geographic location identifier, the aggregate risk map associated with the geographic location, the geographic location parameters (e.g., traffic density, pedestrian density, intersection presence, average speed, speed limit, etc.), and/or any other suitable geographic location data. In a second embodiment, the RAM is selected based on the host vehicle operation parameters. For example, different modules (or weights or factors used therein) can be selected for different vehicle acceleration or velocities. In a third embodiment, different operators are associated with different RAMs (and/or monitored region parameters). For example, an operator with a high driver score or reaction time can have a low weight assigned to unnoticed proximal objects, while an operator with a low driver score can have a high weight assigned to the same object. In a fourth embodiment, the RAM is selected based on the object parameter values (e.g., class, distance, anticipated trajectory, kinematics, operator profile, etc.). In this embodiment, a RAM can be determined for each object that is detected, wherein the multiple RAMs can be combined (e.g., overlaid, etc.) to cooperatively form a composite RAM used to monitor the region. In a specific example, the method can include selecting a first equation in response to detection of a leading vehicle, select a second equation in response to detection of a bicycle located diagonally from the vehicle, and select a third equation in response to anticipated leading vehicle turning. However, the RAM can be otherwise determined.

In a first variation, determining the risk metric for the monitored region includes calculating a risk score for each of a plurality of sub-regions within the monitored region. The risk score can be calculated by an on-board system, a remote system, or by any other suitable system. The risk score can be calculated using an equation with weighted factors, but can be otherwise calculated.

Figure 9:
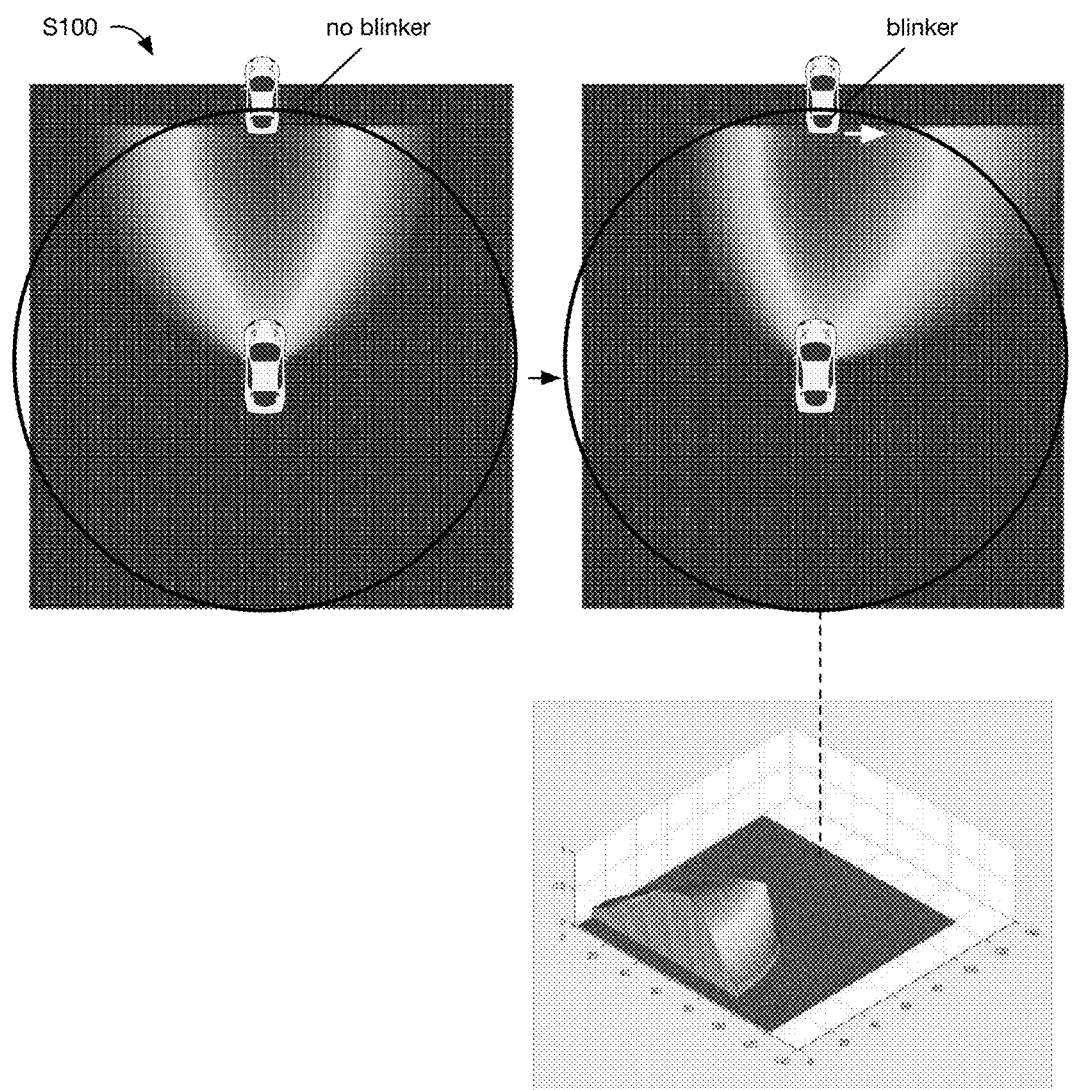
FIG. 9 is an example of how the risk map differs between a risk map based on an object with no turning indication and a risk map based on an object with a turning indication.

In one example, the risk score for a sub-region can be determined based on the presence and type of object, the object's kinematics relative to the vehicle (e.g., FIG. 6), the operator profile of the object (e.g., FIG. 8), the anticipated action of the object (e.g., FIG. 9), and the host vehicle operator's behavior score (e.g., attention or distraction level, etc.). However, the risk score can be otherwise calculated from any other suitable equation.

In a second variation, each sub-region within the monitored region can be associated with a different equation, wherein the scores for each sub-region can be independently calculated. In this variation, the method can include: monitoring the monitored region for an object, identifying the sub-region(s) coincident with the object, calculating the risk score for each of the identified sub-region(s) (e.g., based on the object parameters), and determining the near-collision event based on the calculated risk scores. However, the equations per sub-region can be otherwise used.

In a third variation, the method can include determining the risk score for each sub-region using a neural network. In this variation, the entire monitored region is preferably treated as a single region, wherein a single neural network determines the risk score for each sub-region. However, each sub-region within the monitored region can be associated with a different neural network that determines the associated risk score.

In a fourth variation, the method can include generating a map of the vehicle's environment and tracking the vehicle's location within the environment (e.g., using simultaneous localization and mapping), optionally classifying the identified objects as static or mobile, determining potential vehicle movement paths to each of the sub-regions (e.g., using RRT), and determining a collision probability for each sub-region based on the map and potential vehicle movement paths.

However, the risk score can be determined using a combination of the aforementioned methods, or otherwise determined.

Automatically detecting a near-collision event S200 functions to identify high-risk events. A near-collision event (near-collision event) can be a circumstance requiring an evasive maneuver by the vehicle operator; a circumstance wherein the vehicle has above a threshold probability of colliding with an object; or be otherwise defined.

The near-collision event is preferably determined in real- or near-real time (e.g., as the event is occurring, before the event occurs), but can be determined asynchronously or at any other suitable time. The near-collision event is preferably determined by a system on-board the vehicle (e.g., by an auxiliary system, the vehicle itself, etc.), but can alternatively be determined by a remote computing system or any other suitable system. The near-collision event is preferably automatically detected based on the risk map, but can be otherwise determined. The near-collision event is preferably detected using the concurrent risk map (e.g., the risk map generated within a predetermined time period before the near-collision event, the risk map generated for the time during which the near-collision event was detected, etc.), but can be detected using a prior risk map, a series of prior risk maps, or using any other suitable set of risk maps.

Figure 10:
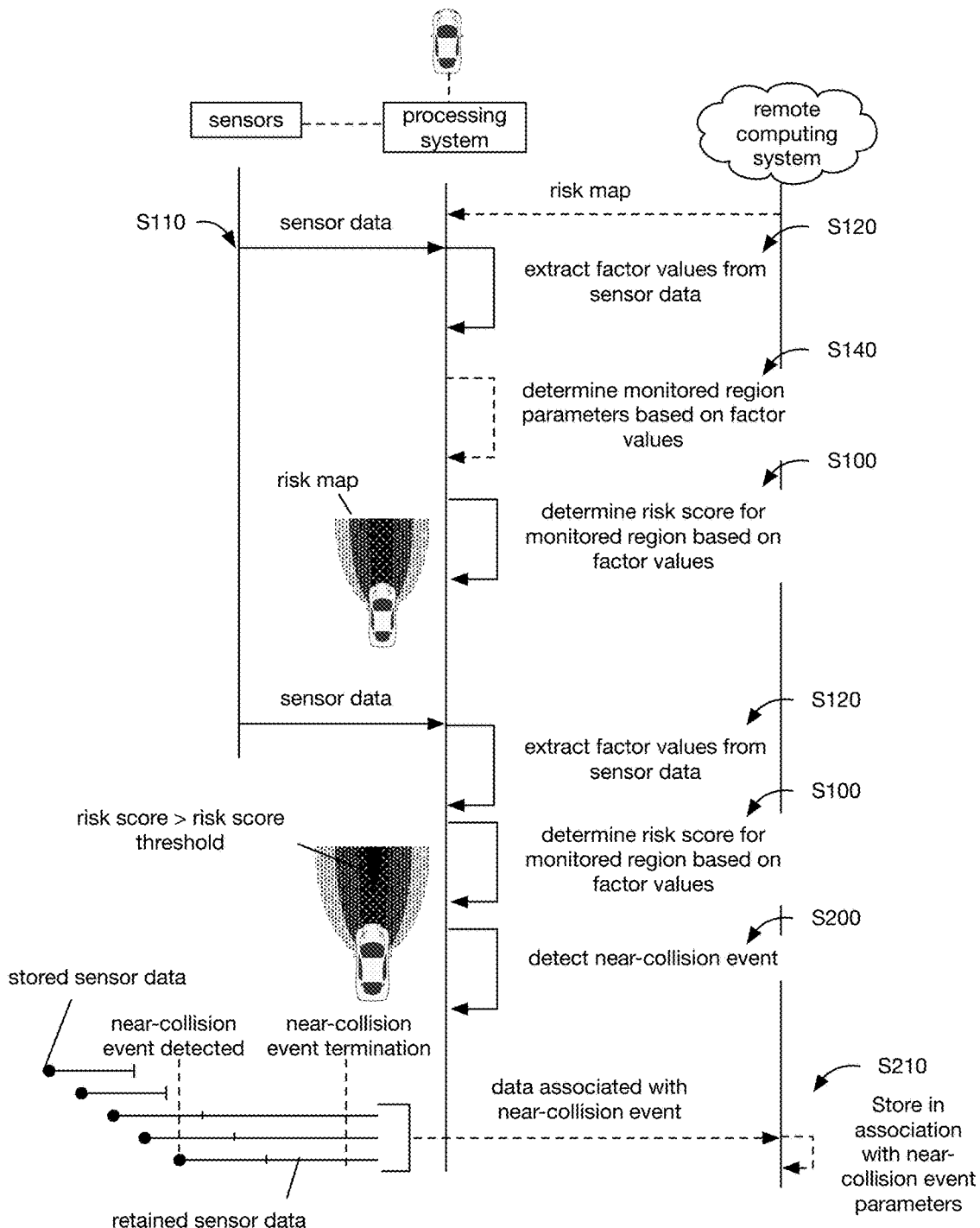
FIG. 10 is a schematic representation of data processing and transfer through an example of the method.

In a first variation, the near-collision event is detected when a high-risk region in the risk map overlaps the object location(s) (example shown in FIG. 10). The high-risk region can be a region (e.g., area, sub-region, point, position, virtual or geographic location) of the monitored region with risk value(s) exceeding a threshold risk value (e.g., risk score), a predefined area of the monitored region assigned as the high-risk area, or otherwise defined. The threshold risk value can be determined (e.g., calculated, selected, etc.) based on the operator profile or score, the historic location risk, operator profiles or scores for proximal objects, or any other suitable factor.

In a second variation, the near-collision event is detected in response to host vehicle movement toward (e.g., the anticipated trajectory or current direction of travel intersects or is pointed toward) or into the high-risk area (e.g., before, during, or after high-risk area identification). In this variation, the risk map can remain static relative to the geographic location for which the risk map was generated, move with the host vehicle, or have any other suitable set of dynamics.

In a third variation, the near-collision event is detected when the vehicle's motion relative to the high-risk area (e.g., within the risk map) substantially matches a near-collision event pattern (e.g., determined based on historic near-collision event patterns), is classified as a near-collision event (e.g., based on the spatial risk metric pattern, temporal risk metric pattern, etc.), or is otherwise associated with a predetermined near-collision event.

In a fourth variation, the near-collision event is detected in response to a risk score within the risk map exceeding a threshold risk score. The near-collision event can be detected immediately upon the risk exceeding the risk score threshold, be detected after the risk exceeds the threshold for a threshold duration, be detected if spatially adjacent risk scores (e.g., a threshold number, threshold distribution, threshold physical or virtual volume or area, etc.) exceed the threshold value, or otherwise detected based on the risk scores within the monitored region. The threshold risk score can be manually selected, automatically determined (e.g., learned from driving sessions labeled with near-collision events), or otherwise determined.

In a fifth variation, the near-collision event is detected in response to the risk score within a threshold distance of the vehicle exceeding a threshold risk value, wherein the monitored region preferably encompasses the threshold distance but can alternatively be otherwise related to the threshold distance. The threshold distance is preferably measured along the vehicle traversal vector, but can alternatively be within a predetermined angular range of the vehicle traversal vector, within a threshold width of the vehicle traversal vector (e.g., the vehicle body's width), be a radius about the vehicle body or center, or otherwise defined. The threshold distance can be predetermined; dynamically determined based on (e.g., vary as a function of): the user attentiveness, cognitive ability, reaction time, distraction level, vehicle speed, object trajectory, kinematics, or distribution, or otherwise determined. For example, the near-collision event can be detected in response to the risk score within 5 ft in front of the vehicle exceeding a threshold risk score.

In a sixth variation, the near-collision event is detected in response to the total area or volume of sub-regions within the monitored region having risk scores exceeding a threshold risk score exceeding a threshold area or volume.

In a sixth variation, the near-collision event is detected in response to a pattern of sequential risk maps for a vehicle substantially matching (e.g., consistent with) a pattern associated with a near-collision event. However, the near-collision event can be otherwise determined.

In a seventh variation, the near-collision event is detected based on signals sampled by sensors on-board the vehicle (e.g., auxiliary system sensors, vehicle sensors, proximity sensors, etc.), vehicle parameters (e.g., acceleration pedal position, steering wheel position, brake position, etc.), external vehicle sensor signals, or based on any other suitable measurement, using pattern matching (e.g., wherein the sensor signal pattern matches a pattern associated with a near-collision event), neural networks, rules, or using any other suitable method. For example, the near-collision event can be detected when a deceleration spike is detected in the kinematic sensor measurements, when a surprised driver expression is detected from an interior-facing camera stream, when a kinematic pattern substantially matches a "swerving" pattern (e.g., based on the vehicle's sensors, such as brake pedal position; based on the system's accelerometer, gyroscope, or IMU measurements indicating a G-force exceeding a predetermined threshold; based on images recorded by the recording system; the lateral acceleration exceeds a threshold acceleration; etc.), when the brakes are suddenly applied, when an object occupies more than a threshold proportion of an external-facing camera's field of view, when screeching is detected (e.g., from the audio sensor), when a collision is detected (e.g., wherein the sensor data sampled before the collision time is associated with a near-collision event; wherein a collision is detected in response to the measured G-force exceeding a collision threshold, in response to the acoustic pattern substantially matching a collision pattern, in response to the airbags deploying, or otherwise determined), or when any other suitable condition associated with a near-crash event is detected.

However, the near-collision event can be otherwise determined.

The method can optionally include storing parameters of the near-collision event S210. Near-collision event parameters can include: a near-collision event time (e.g., detection time, sampling timestamp of the underlying data, etc.), the vehicle location during the near-collision event (e.g., received from the location sensor of the on-board system), parameters of the driving context (e.g., vehicle location information, such as lane identifier, road type, traffic conditions; weather conditions; etc.), the operator identifier for the vehicle's operator (e.g., determined using the method disclosed in U.S. application Ser. No. 15/642,094 filed 5 Jul. 2017, incorporated herein by this reference, retrieved, or determined using any other suitable method), a vehicle identifier for the vehicle, the object's identifier, the near-collision direction, or other factor values.

Figure 11:
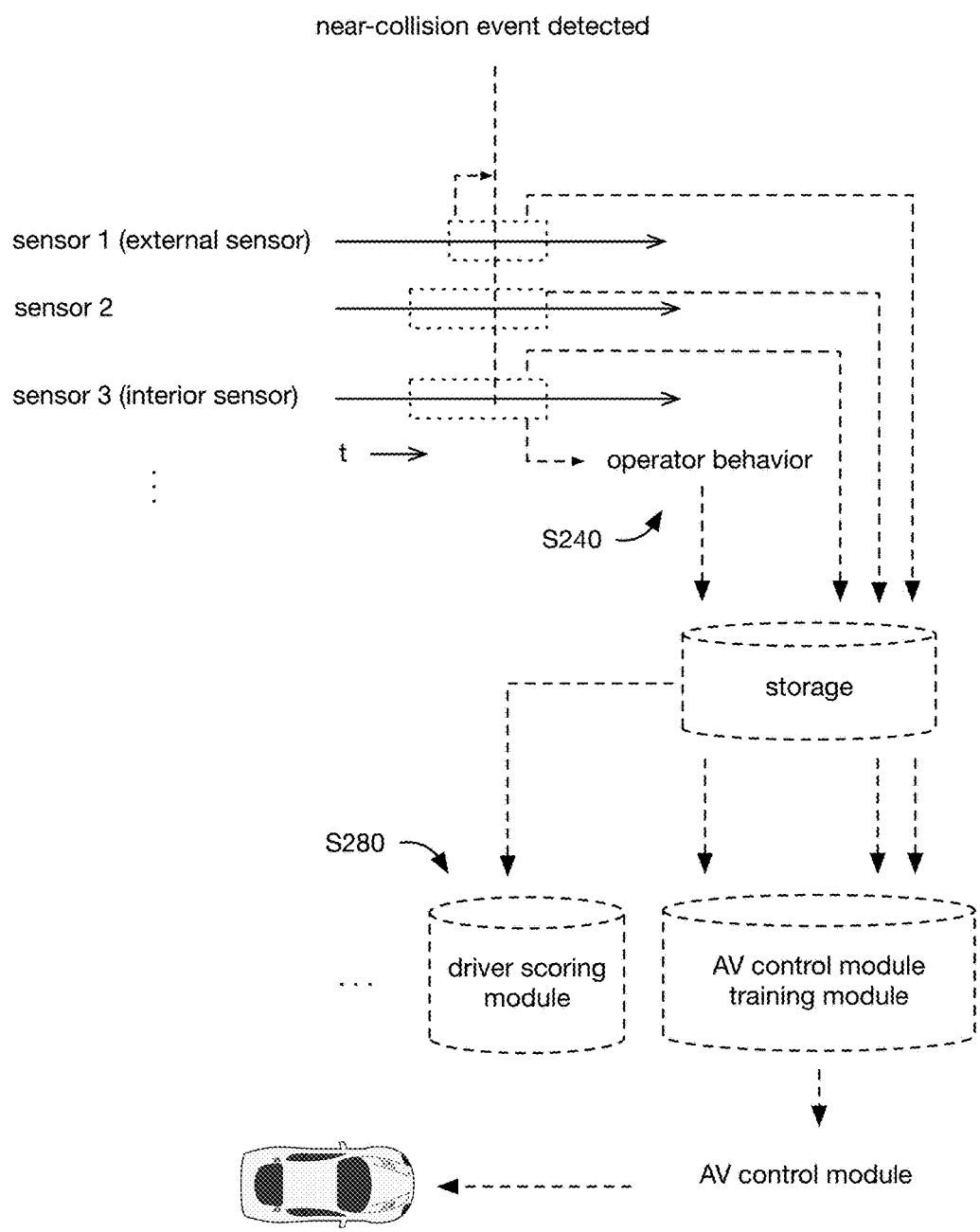
FIG. 11 is an example of data that can be stored in association with the near-collision event.

The method can optionally include storing associated data with the near-collision event parameters (e.g., FIG. 11). Associated data can include: underlying data (e.g., data from which the near-collision event was detected); sensor data sampled preceding, during, or following the near-collision event (e.g., a sensor stream segment sampled within a time window of the near-collision event), sensor data sharing a parameter with the near-collision event (e.g., collected during the same driving session), or any other suitable data. The stored associated data can be selected based on the near-collision event label (e.g., wherein different labels can be associated with different data types and/or timeframes), be a predetermined set of data (e.g., only camera images and kinematic sensor data sampled within a predetermined timeframe), or be any other suitable data. In one example, data describing the near-collision event context (e.g., a segment of the proximity sensor data, exterior-facing camera video, or other sensor data stream or timeseries) and data associated with the operator reaction (e.g., a segment of the interior-facing camera video, vehicle control input sensors, user response data, or other sensor data stream or timeseries) can be stored in association with the near-collision event parameters. The stored segment of the sensor data stream or timeseries can be the sensor signals sampled a predetermined time window before, after, and/or during the near-collision event timeframe, be the sensor signals for the entire driving session, or be any other set of sensor signals. The time window can be predetermined; vary based on the risk map's highest risk score, risk score distribution, or other risk parameter; selected based on whether a collision occurred; selected based on the near-collision cause or class, or otherwise determined. The parameters, data, or other information can be stored by the on-board system, by a remote system (e.g., wherein the information can be transmitted in near-real time or asynchronously, such as when a given connection type is detected, from the processing or recordation system to the remote system), or by any suitable system.

The method can optionally include labeling the near-collision event, which functions to ease subsequent aggregate near-collision event processing. Additionally or alternatively, the driving session (e.g., session identifier, session data, etc.) can be labeled as a near-collision event, with the near-collision event label, or otherwise labeled. The near-collision event can be automatically labeled (e.g., by a remote computing system, by the vehicle, etc.), manually labeled, or otherwise labeled. The near-collision event is preferably labeled asynchronously, but can alternatively be labeled in real- or near-real time. The label can be: a near-collision event class or type (e.g., collision with a lead vehicle, side collision with a bicycle, pedestrian, signage, or curb, reverse collision, etc.; wherein the near-collision event can be classified based on the substantially concurrently recorded data), a risk severity (e.g., very close miss, etc.), a near-collision cause, or any other suitable set of descriptors.

The method can optionally include determining the cause of the near-collision event (e.g., the set of precipitating event(s)) S230. The cause can be stored in association with (e.g., used to label) data underlying the near-collision event detection or otherwise used. The cause can be used to: filter, cluster, or otherwise manage the near-collision events, assign fault in a collision, calculate a driver score (e.g., wherein near-collision events that are not caused by the operator can be excluded from the operator score calculation), automatically identify or fill out a report (e.g., insurance report, accident report, etc.), adjust the respective risk map's influence on an aggregate collision risk map for a geographic location, determine which training data should be used for autonomous vehicle control module or risk map module training (e.g., filter out data for near-collision events caused by the driver, identify edge cases, etc.), determine notification or automatic control parameters, or otherwise used.

In a first variation, the cause can be determined based on subsequent vehicle behavior relative to a predetermined risk map. For example, the vehicle operator can be determined as the cause when the vehicle trajectory is directed toward (e.g., intersects, is within a predetermined distance or angular region of, etc.) a predetermined high-risk risk map region, or when the vehicle subsequently moves toward the predetermined high-risk risk map region. In a second example, the object can be determined as the cause when the vehicle trajectory is not directed toward the high-risk risk map region but the high-risk risk map regions proximal the vehicle increase over time (e.g., due to object movement). However, the cause can be otherwise determined based on subsequent vehicle behavior.

In a second variation, the cause can be determined based on the RAM. In one embodiment, the cause can be determined based on individual parameters of the RAM's model. For example, the cause can be determined based on the independent parameter with the highest weight, the highest weighted value (e.g., product of the weight and factor value), the highest factor value highest influence on the risk score, the lowest value of the above, or any other suitable parameter. The cause can be the parameter itself, a cause associated with the parameter or factor, a cause associated with the most influential parameters (e.g., parameter combination, parameter value combination, etc.), or be otherwise determined. In a second embodiment, the cause can be determined based on a derivative or integration of the RAM or resultant risk metrics (e.g., risk maps). In a third embodiment, the cause can be determined based on the series of RAMs that are selected over time for a given vehicle (e.g., wherein the temporal pattern of RAMs are associated with a predetermined cause), or based on the series of risk metrics (e.g., risk maps) generated by the respective RAMs. However, the cause can be otherwise determined from the RAM and/or resultant risk metrics.

In a third variation, the cause can be determined from analysis of the data associated with the near-collision event. In a first embodiment, the method includes detecting the near-collision event with the risk map, retrieving data recorded within a predetermined time window of the near-collision event (e.g., including all, some, or none of the data used to generate the risk map), and analyzing the data for the cause. The data can include external video, internal video, proximity sensor data, vehicle sensor data, or any other data. The data can be analyzed using pattern matching (e.g., wherein different signal patterns are associated with pre-associated causes), classification, neural networks, rules, decision trees, Bayesians, support vectors, genetic programs, or any other suitable method. In a specific example, the interior-facing camera stream recorded before, during, and/or after the near-collision event (e.g., a segment of the internal video encompassing or otherwise related to the near-collision event) can be analyzed to determine whether the driver saw the object before collision. In a second specific example, the location system measurements can be analyzed to determine whether the driver was driving within the lane boundaries. In a third specific example, the object's sensor measurements before, during, and/or after the near-collision event can be analyzed to determine the object fault contribution. However, the cause can be otherwise determined.

The method can optionally include verifying the near-collision event (e.g., before storing the near-collision event or labeling the driving data). In one variation, verifying the near-collision event includes detecting the same near-collision event (e.g., with the same or similar parameters, timestamp, etc.) with separate detection variants (e.g., disclosed above) or detection systems. For example, a near-collision event can be detected when the risk map includes a risk score above a threshold value, and can be verified in response to determination that an object (located at the sub-region with the high risk score) is moving toward the vehicle, based on proximity sensor signals. In a second example, a near-collision event can be detected when the risk map includes a risk score above a threshold value (e.g., at a first time, based on signals sampled at a first time), and can be verified when sensor signals associated with evasive maneuvers (e.g., sampled before, after or during the first time) are also identified.

The method can optionally include determining the operator behavior associated with the near-collision event S240. Examples of operator behaviors include: evasive maneuvers (e.g., steering, braking, acceleration, a combination of control inputs that approach the limits of vehicle capabilities, etc.), pre-incident maneuvers, attentiveness, or any other suitable behavior. The operator behavior is preferably determined from sensor signals monitoring the operator volume, such as an interior-facing camera, operator-facing camera, or vehicle control input sensors (e.g., pedal sensors, steering wheel sensors, etc.), but can additionally or alternatively be determined from sensor signals monitoring the exterior volume or any other suitable sensor. Determining the operator behavior can include: identifying the operator behavior in the sensor signals, identifying the sensor signals describing the operator behavior, classifying or labeling the operator behavior (e.g., good, bad, safe, unsafe, etc.), or otherwise processing the operator behavior. The operator behavior can be determined using: a classifier, a pattern matching system, a set of rules (e.g., signals sampled that are by a predetermined set of sensors within a predetermined time window are associated with the operator behavior), or otherwise determined. The operator behavior can be stored with the respective near-collision event information, used to determine the respective operator's driver score, or otherwise used.

The method can optionally include acting in response to detection of the near-collision event S250, which can function to use the detected near-collision event and/or parameters thereof in one or more applications. For example, automatic driver notifications can be presented, automatic vehicle control can be performed, virtual simulations can be generated, or any other suitable action can be automatically taken in response to near-collision event detection.

Figure 16:
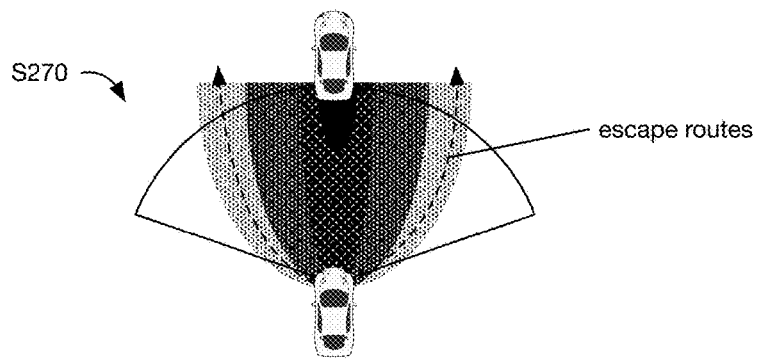
FIG. 16 is a schematic representation of determining escape routes using the risk map.

In a first variation, the method can include generating a notification based on the detected near-collision event and/or associated factors or parameters (e.g., cause). The notification can be generated and/or transmitted before, during, or after the near-collision event. The notification can be for a user (e.g., include a recommendation or notification for management entity, the operator, an insurance entity, etc.), vehicle, or other endpoint. The notification can be automatically generated and/or presented, but can alternatively be otherwise controlled. In a first example, a notification, such as a flashing light, audio notification (e.g., warning sound), vehicle component actuation (e.g., seat vibration, steering wheel vibration, etc.), or other notification can be presented to the user in response to detection of a near-collision event. In a second example, the vehicle can be automatically controlled to avoid an imminent collision. For example, in response to imminent collision detection, the accelerometer can be remapped, the brakes automatically applied, the speed automatically reduced, or the wheels automatically turned (e.g., to enter or follow an automatically determined escape route, example shown in FIG. 16, which can be determined from the concurrent risk map or otherwise determined). In a third example, driving behavior recommendations (e.g., coaching recommendations) can be transmitted to the operator. Subsequent driver behavior can optionally be subsequently monitored for a predetermined duration for positive (e.g., decreased near-collision event frequencies) or negative (e.g., increased near-collision event frequencies) changes in driving behavior. A different recommendation can be provided to the driver when negative changes are determined, while the same or similar recommendation can be provided to other operators (e.g., with similar risk profiles, driving habits, causes, etc.) when positive changes are determined (e.g., cause occurrence frequency falling below a threshold frequency during a predetermined time window). However, any other suitable action can be taken.

In a second variation, the method can include sending the associated sensor measurements to a remote computing system. The associated sensor measurements can include the sensor measurements underlying the near-collision event detection, sensor measurements recorded a predetermined time duration preceding the near-collision event, or any other suitable sensor measurement.

In a third variation, parameters of the near-collision events (e.g., frequency, severity, type, cause, etc.) detected for a given driver (e.g., identified by the driver's phone, driver's biometrics, etc.) can be used to assign a driver score indicative of the driving risk or safety to the driver. The driver score can subsequently be used to determine: parameters of the risk map (e.g., monitored region, risk score determination, etc.), parameters of the RAM, conditions triggering near-collision event detection, insurance premium determination, drivers for driving coaching courses, which training data should be used for autonomous vehicle control module training, or otherwise used.

In a fourth variation, the vehicle and/or object actions before, during, and/or after the near-collision event can be extracted, analyzed, and utilized. In a first example, the vehicle behavior, object behavior, driver actions, or other parameters preceding the near-collision event can be extracted and used to refine risk map generation, determine the cause of the near-collision event, assign fault to the driver (e.g., determine fault percentage), or otherwise used. This information can additionally or alternatively be used to identify weak areas in a driver's driving skillset, which can be targeted for coaching improvement. In a second example, the vehicle trajectory or driver actions taken to avoid the collision can be extracted and used to coach other drivers in similar situations, used to anticipate the reactions of similar objects in a similar situation (e.g., anticipate how a pedestrian will react in a similar situation), used in determining autonomous vehicle responses in similar situations, or be otherwise used. However, the near-collision detection event and/or parameters thereof can be otherwise used.

In a fifth variation, the method includes training modules based on the near-collision event information set S280. The near-collision event information set (e.g., plurality of near-collision event data) can include the near-collision events (preferably labeled, alternatively unlabeled) and/or associated data that are aggregated for a given operator, vehicle, user population, location, timeframe (e.g., recurrent timeframe, single timeframe, etc.), all method instances (e.g., for a plurality of enabled or un-enabled vehicles), or other parameter. The information set can be used to generate a training set (e.g., supervised, alternatively unsupervised) for module training (e.g., calibration, updating, etc.). Modules that can be trained using the training set include: the monitored region size determination module, the monitored region shape determination module, the monitored region orientation determination module, the risk determination module, the risk equation selection module, autonomous vehicle control module (AV control module), or any other suitable module. The trained module is preferably subsequently used in the method, used to control a secondary vehicle (e.g., the AV control module), or otherwise used.

Figure 17:
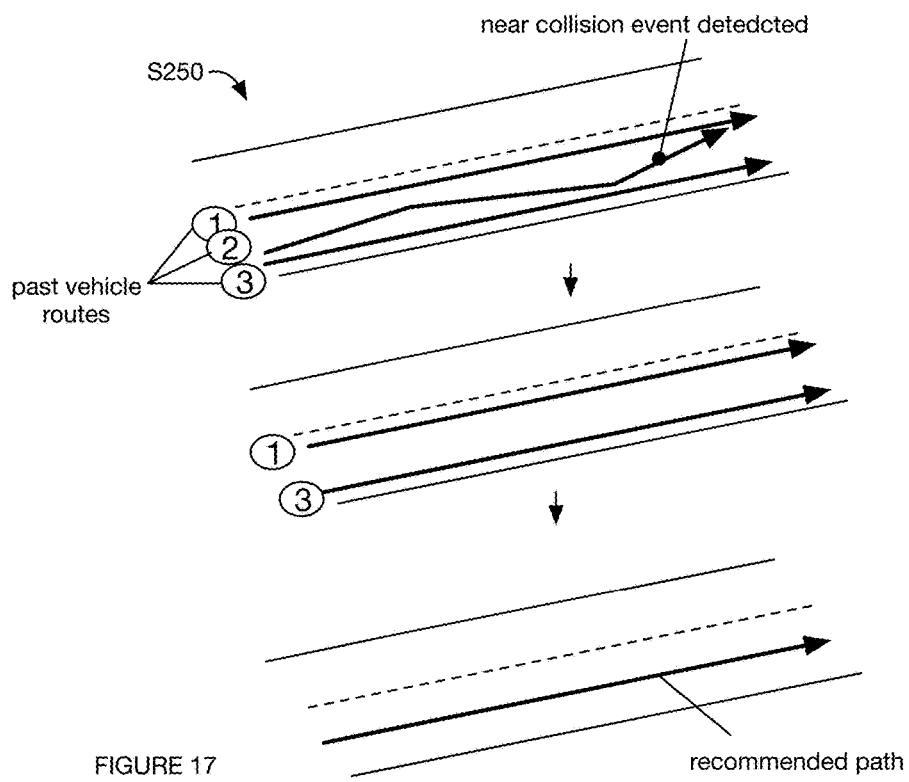
FIG. 17 is a schematic representation of determining a recommended traversal route using a plurality of recorded traversal routes, including filtering out the recorded traversal routes associated with near-collision events.

In a first example, the near-collision event information set can be filtered to include or exclude a predetermined set of causes, wherein the AV control module can be trained on the filtered set. For example, the driving trajectory, trajectory classification, or driver response associated with a near-collision event can be used to filter good driving trajectories or responses from bad driving trajectories or responses, or otherwise differentiate between different driving trajectories (example shown in FIG. 17). Good driving trajectories can include trajectories or driver responses that are: generated by drivers with high driver scores (e.g., above a manually or automatically determined threshold score), responsive to near-collision events that were not caused by the driver, successful at mitigating or avoiding a collision, did not result in subsequent regions of high collision risk, or otherwise characterized. These driving trajectories can be subsequently used to control autonomous vehicle traversal, be used to train or develop autonomous vehicle control modules, or be otherwise used.

In a second example, operator-caused near-collision events can be filtered out of the near-collision event information set used to train the AV control module. In a third example, the information set can be filtered to identify edge cases (e.g., rare occurrences, as manually determined or determined based on the label occurrence frequency in the information set), wherein the edge cases can be used to train the AV control module. In a fourth example, the information set includes data describing the near-collision event context (e.g., proximity sensor data, exterior-facing camera video, or other sensor stream segment, etc.) and data describing the operator's reaction (e.g., interior video, vehicle control input sensors, or other sensor stream segment, etc.). In this example, the information set can be filtered for near-collision events with successful evasive maneuvers (e.g., near-collision events that were not followed by a collision event within a predetermined timeframe), desired behaviors (e.g., safe maneuvers, etc.), good drivers (e.g., operators with high driver scores), a predetermined set of causes, or other parameters (e.g., associated with desired evasive maneuvers), wherein the identified near-collision event information (e.g., data for the precipitating causes and user responses) can be used to train the AV control module. In a fifth example, the near-collision event information set can be filtered to include specific road geometries (e.g., roundabouts, intersections, etc.), wherein the AV control module can be trained on the filtered set.

However, the near-collision event can be otherwise acted upon, as described above.

The method can optionally include acting on the stored risk maps, which functions to characterize the risk for a given geographic location, driving session (or segment thereof), vehicle, driver, or other data object. The risk maps are preferably processed and/or acted upon by the remote computing system (e.g., wherein the risk maps or parameters thereof are transmitted to the remote computing system from the vehicle(s)), but can alternatively be processed and/or acted upon by a on-board vehicle system, a secondary vehicle system, or any other suitable system.

In a first variation, a collision risk map for a given geographic location or region can be generated from the risk maps and/or near-collision events aggregated across a population of vehicles. The collision risk map can be generated for and/or stored in association with each of a plurality of locations, a single location, or any location set. The collision risk map can include the risk (e.g., from the risk maps), collision, and/or near-collision hot-spots in real- or near-real time, for a predetermined recurrent time (e.g., time of day), or for a predetermined time duration (e.g., across all time). In one example, the collision risk map can reflect a near-real time map of traffic dynamics, which can be used for dynamic route planning, increased ADAS sensitivity, or otherwise used by a secondary vehicle. In a second example, the collision risk map can be used for infrastructure management or improvement. In a specific example, collision hot-spots can be targeted for driver visibility improvements, traffic lane divider insertion, or other infrastructure improvements. In a third example, the collision risk map can be used to adjust the parameters of the risk map, parameters of the RAM (e.g., which parameters are included, the parameter value ranges, the parameter weights, the model itself, etc.), conditions triggering near-collision event detection, or otherwise feeding back into the near-collision detection method. For example, the region monitored for near-collision events can be dynamically increased in locations with a high frequency of near-collision events.

Figure 15:
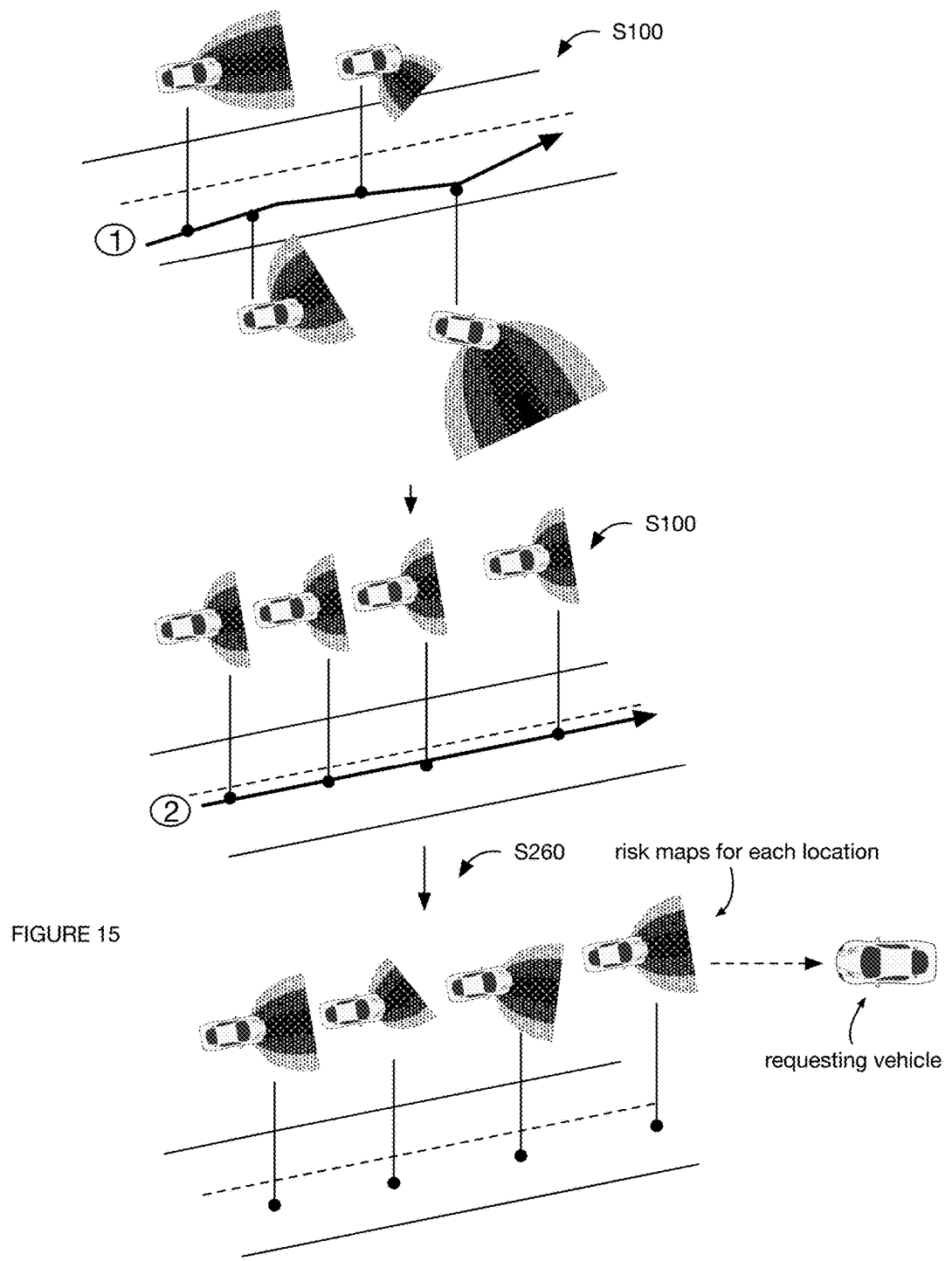
FIG. 15 is a schematic representation of determining an aggregate risk map for a geographic location using risk map from a first and second vehicle.

In one embodiment of the first variation, the method includes aggregating the risk maps for a given geographic location or region (e.g., in real time, for all time, for a recurrent time frame such as 8 a on a Monday, etc.) to generate a collision risk map for the geographic location S260 (e.g., FIG. 15). In one example, the method can include receiving a collision risk map request with a location identifier for a secondary vehicle (e.g., from the secondary vehicle, navigation system, or other endpoint) and/or retrieving and transmitting the risk map associated with the location identifier to the secondary vehicle or associated system for secondary vehicle navigation, operation, or other uses.

For example, the ADAS for secondary vehicles can automatically slow the vehicles down in high-risk areas. The secondary vehicle can be a vehicle within the enabled vehicle population (e.g., capable of performing the system, that includes the computing system, etc.), an un-enabled vehicle outside of the enabled vehicle population (e.g., incapable of performing the system, lacking the computing system, etc.), or be any suitable vehicle.

In a second variation, the method includes identifying escape routes for the vehicle based on the risk map S270, wherein the escape routes can be used to generate operator notifications (e.g., haptic, optical, etc. notifications), automatically control vehicle operation (e.g., to travel along the escape route), or otherwise used. An escape route can be: a trajectory passing through regions with risk scores below a threshold value, a trajectory with an average or aggregate risk score less than a threshold value, or be otherwise defined. However, the risk map can be otherwise used.

Embodiments of the system and/or method can include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

We claim:

1. A method for near-collision analysis, comprising, at an on-board system mounted to a vehicle:
   recording an external video with an external-facing camera of the on-board system;
   determining obstacle parameters for an obstacle detected in the external video;
   generating a spatial risk map for the vehicle based on the obstacle parameters, the spatial risk map comprising a risk score for each of a plurality of spatial positions relative to the vehicle wherein the risk score is determined using:
      a parametric model comprising a set of Gaussian models;
      the obstacle parameters; and
      driver parameters extracted from an internal video recorded by an internal-facing camera of the on-board system;
   detecting a near-collision event when a risk score within the spatial risk map exceeds a risk threshold;
   labeling the near-collision event with a label determined based on the driver parameters;
   determining a cause of the near-collision event, comprising identifying an independent parameter of the parametric model with a highest weighted value; and
   transmitting the label to a remote computing system.

2. The method of claim 1, further comprising determining secondary obstacle parameters for a second obstacle detected in the external video, wherein each risk score is calculated based on the obstacle parameters and the secondary obstacle parameters.

3. The method of claim 1, wherein the cause of the near-collision event is determined based on the driver parameters, wherein the label comprises the driver cause.

4. The method of claim 1, further comprising transmitting a segment of the external video and a segment of the internal video to the remote computing system, in association with the label.

5. The method of claim 4, further comprising:
   determining a driver response to the near-collision event from the internal video;
   aggregating driver responses to near-collision events for a plurality of drivers;
   identifying good drivers associated with high driver scores;
   determining the driver responses of the good drivers to near-collision events sharing a common label; and
   training a vehicle control system based on the driver responses of the good drivers, the associated segment of the external video, and the associated segment of the internal video, wherein the vehicle control system controls an autonomous vehicle.

6. A method for near-collision analysis, comprising:
   sampling an external image with an external-facing camera mounted to a vehicle;
   determining obstacle parameters for an obstacle detected from the external image;
   generating a spatial risk map for the vehicle based on the obstacle parameters, the spatial risk map comprising a risk score for each of a set of spatial positions relative to the vehicle, wherein the risk score is determined using:
      a parametric model comprising a set of Gaussian models;
      the obstacle parameters; and
      driver parameters associated with a driver of the vehicle;
   detecting a near-collision event when a risk score within the spatial risk map exceeds a risk threshold;
   labeling the near-collision event with a label determined based on the driver parameters;
   transmitting the label to a remote computing system; and
   determining a cause of the near-collision event, comprising identifying an independent parameter of the parametric model with a highest weighted value.

7. The method of claim 6, wherein a processing system on-board the vehicle detects and labels the near-collision event.

8. The method of claim 6, further comprising determining secondary obstacle parameters for a second obstacle detected from the external image, wherein the spatial risk map is further generated based on the secondary obstacle parameters.

9. The method of claim 6, wherein the driver parameters comprise a driver response determined from sensor signals sampled during the near-collision event.

10. The method of claim 9, wherein the sensor signals comprise an internal image sampled by an internal-facing camera mounted to the vehicle.

11. The method of claim 9, further comprising:
    aggregating driver responses to near-collision events for a plurality of drivers;
    identifying good drivers associated with high driver scores;
    determining the driver responses of the good drivers; and
    training a vehicle control system based on the driver responses of the good drivers, wherein the vehicle control system controls an autonomous vehicle.

12. The method of claim 11, further comprising:
    associating the near-collision event with a driver of the plurality; and
    for each of the plurality of drivers, determining a driver score based on a history of near-collision events associated with the driver.

13. The method of claim 12, further comprising coaching the driver based on the history of near-collision events associated with the driver.

14. The method of claim 6, wherein, in response to the independent parameter with the highest weighted value comprising a driver parameter, determining a driver cause based on an internal image sampled by an internal-facing camera before the near-collision event, wherein the near-collision event is labeled with the driver cause.

15. The method of claim 14, wherein the internal-facing camera is statically mounted at a known orientation to the external-facing camera, wherein determining the driver cause comprises determining a driver gaze direction relative to the obstacle based on the known orientation.

16. The method of claim 6, further comprising:
   determining a near-collision location associated with the near-collision event; and
   aggregating near-collision locations of near-collision events from a plurality of vehicles into a geographic risk map.

* * * * *